(12) United States Patent
de Oliveira et al.

(10) Patent No.: US 12,456,204 B1
(45) Date of Patent: Oct. 28, 2025

(54) COMPUTER VISION-DRIVEN INTERACTIVE FULL-BODY MOTION TRACKING

(71) Applicant: Sword Health, S.A., Oporto (PT)

(72) Inventors: Luís António Correia de Oliveira, Oporto (PT); Pedro Henrique Oliveira Santos, Oporto (PT); Gustavo Seixas De Sá Burmester, Oporto (PT); Ricardo Miguel Pontes Leonardo, Oporto (PT); Pedro Fillipe da Silva Rodrigues, Oporto (PT)

(73) Assignee: SWORD HEALTH, S.A., Oporto (PT)

( * ) Notice: Subject to any disclaimer, the term of this patent is extended or adjusted under 35 U.S.C. 154(b) by 0 days.

(21) Appl. No.: 19/097,799

(22) Filed: Apr. 1, 2025

(51) Int. Cl.
| | |
|---|---|
| *G06K 9/00* | (2022.01) |
| *G06T 5/90* | (2024.01) |
| *G06T 7/20* | (2017.01) |
| *G06T 7/50* | (2017.01) |
| *G06T 7/70* | (2017.01) |

(52) U.S. Cl.
CPC ............... *G06T 7/20* (2013.01); *G06T 5/90* (2024.01); *G06T 7/50* (2017.01); *G06T 7/70* (2017.01); *G06T 2207/20208* (2013.01); *G06T 2207/30196* (2013.01)

(58) Field of Classification Search
CPC .............................. G06N 3/045; G06N 3/063
See application file for complete search history.

(56) References Cited

U.S. PATENT DOCUMENTS

| | | | | |
|---|---|---|---|---|
| 2011/0299761 | A1* | 12/2011 | Myokan | .................... G06T 7/85 |
| | | | | 382/154 |
| 2021/0001172 | A1* | 1/2021 | Namboodiri | ........... G16H 20/30 |
| 2021/0346761 | A1* | 11/2021 | Sterling | ................ G06N 20/00 |
| 2022/0030148 | A1* | 1/2022 | Gruhlke | ............... G02B 13/002 |
| 2024/0112427 | A1* | 4/2024 | Berliner | .................. G06T 19/00 |
| 2024/0257309 | A1* | 8/2024 | Holland | ..................... G06T 7/30 |

OTHER PUBLICATIONS

Wu, Po-Jung, Kuang-Tsu Shih, and Homer Chen. "Dual-camera HDR synthesis guided by long-exposure image." 2016 Asia-Pacific Signal and Information Processing Association Annual Summit and Conference (APSIPA). IEEE, 2016. (Year: 2016).*

(Continued)

*Primary Examiner* — Hadi Akhavannik
(74) *Attorney, Agent, or Firm* — SCHWEGMAN LUNDBERG & WOESSNER, P.A.

(57) ABSTRACT

Systems and methods described herein relate to computer vision-driven full-body motion tracking using a portable computing device. The portable computing device has a first image sensor and a second image sensor to capture images of a full body of the user while the user is performing exercises. The images are captured while the portable computing device is positioned in a substantially vertical orientation. The images are processed to generate high dynamic range (HDR) image data and to determine depth information associated with the user. Motion tracking data is generated in real time, using the HRD image data and the depth information, while the user is performing an exercise. Real-time interactive feedback may be provided during exercises.

20 Claims, 15 Drawing Sheets

(56) References Cited

OTHER PUBLICATIONS

Chari, Pradyumna, Anil Kumar Vadathya, and Kaushik Mitra. "Optimal HDR and depth from dual cameras." arXiv preprint arXiv:2003.05907 (2020). (Year: 2020).*

"Depth Map from Stereo Images", OpenCV.org, [Online]. Accessed online Mar. 28, 2025, Retrieved from the Internet: <https://docs.opencv.org/4.x/dd/d53/tutorial_py depthmap.html>, 2 pgs.

"MediaPipe BlazePose GHUM 3D", Model Card, Proceedings of FAT Conference ACM, New York, NY, USA, [Online]. Retrieved from the Internet: <https://developers.google.com/static/ml-kit/images/vision/pose-detection/pose_model_card.pdf>, (Jan. 2019), 9 pgs.

"MoveNet.SinglePose", Tensorflow, [Online]. Accessed online Mar. 28, 2025, Retrieved from the Internet: <https://storage.googleapis.com/movenet/MoveNet.SinglePose%20Model%20Card.pdf>.

D'Eusanio, Andrea, et al., "RefiNet: 3D Human Pose Refinement with Depth Maps", 2020 25th International Conference on Pattern Recognition (ICPR), (Jan. 2021), 9 pages.

Yao, Yao, et al., "MVSNet Depth Inference for Unstructured Multiview Stereo", Proceedings of the European Conference on Computer Vision (ECCV), (Apr. 2018), 17 pages.

\* cited by examiner

1

COMPUTER VISION-DRIVEN INTERACTIVE FULL-BODY MOTION TRACKING

TECHNICAL FIELD

Subject matter in the present disclosure generally relates to computer vision. More specifically, but not exclusively, the subject matter relates to computer vision-driven methodologies for motion tracking and to portable computing devices for implementing such methodologies.

BACKGROUND

The field of digital therapy, encompassing a range of activities and treatments, has seen advancements in recent years, particularly with the integration of technology to assist users in remotely performing exercises. For example, a user of a digital therapy platform can perform exercises at home or other convenient settings, with the digital therapy platform implementing motion tracking technology to monitor exercise sessions and provide remote support.

To this end, users of digital therapy platforms can use portable computing devices, such as tablet devices or mobile phones, for computer vision-based motion tracking. A portable computing device can employ a front-facing camera to capture images of a user while the user is performing an exercise, and can present information (e.g., exercise instructions) to the user via a display of the portable computing device. These portable computing devices are often used in variable environments and for different types of exercises or activities, making it technically challenging to provide accurate motion tracking and real-time feedback.

BRIEF DESCRIPTION OF THE SEVERAL VIEWS OF THE DRAWINGS

In the drawings, which are not necessarily drawn to scale, like numerals may describe similar components in different views. To easily identify the discussion of any particular element or act, the most significant digit or digits in a reference number refer to the figure number in which that element is first introduced. Some non-limiting examples are illustrated in the figures of the accompanying drawings in which.

DETAILED DESCRIPTION

Figure 1:
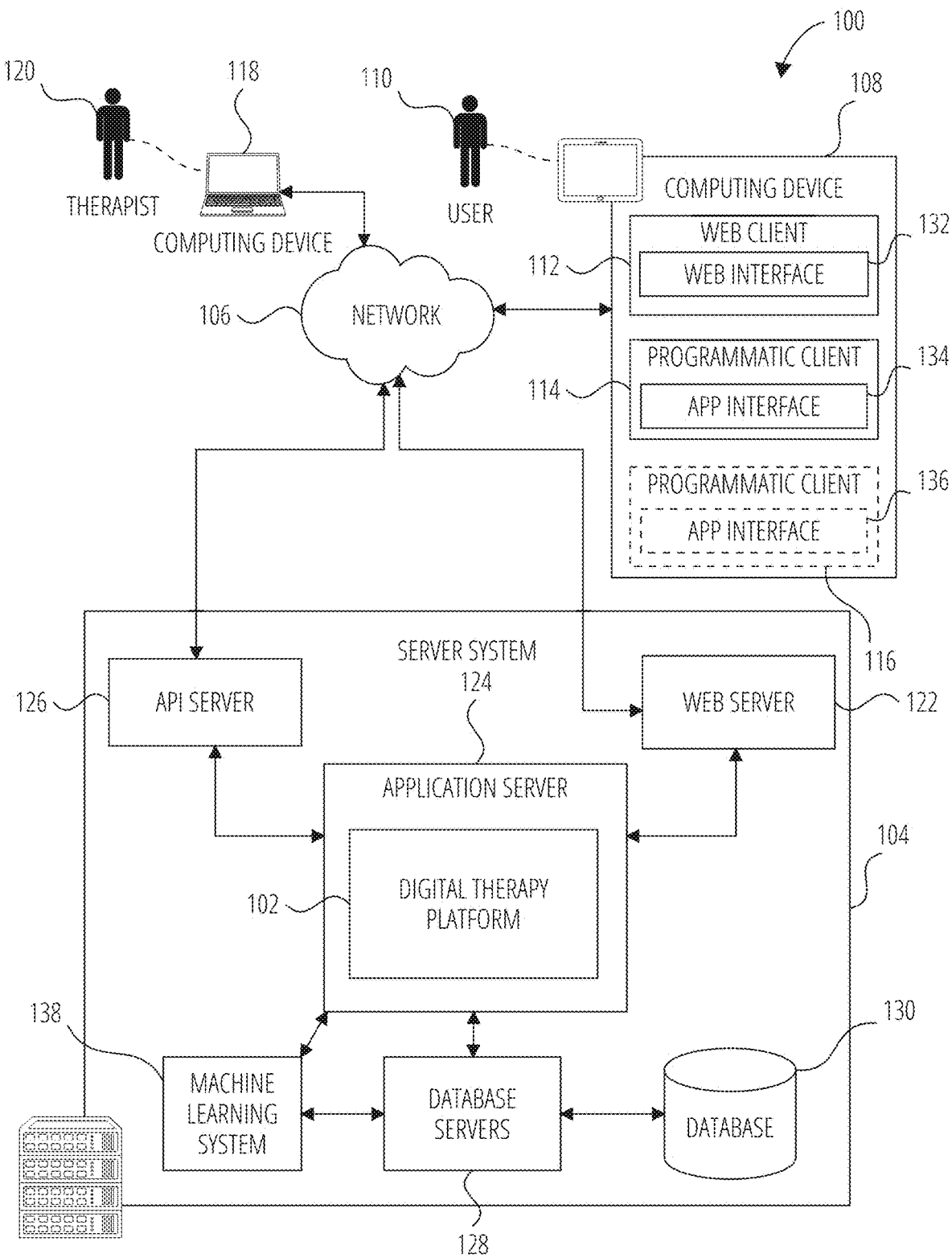
FIG. 1 is a schematic diagram illustrating a networked computing environment that includes a digital therapy platform, according to some examples.

Examples in the present disclosure relate to systems and methods that address technical challenges related to computer vision in a digital therapy context. In at least some examples, a portable computing device leverages multiple sensors and computer vision software that work together to facilitate full-body motion tracking and interactive exercise sessions.

When portable computing devices are used in a digital therapy platform, users often set them up in an ad hoc manner based, for example, on when and where they decide to complete their exercise sessions. For instance, a user positions their portable computing device on a table, with a front-facing camera and display thereof facing the user, and completes an exercise session via a digital therapy application executing on the portable computing device. Various technological problems can lead to challenges in providing effective digital therapy in this context, including software-related and hardware-related issues.

Conventional portable computing devices, such as tablet devices and mobile phones, have a front-facing camera with a relatively narrow field of view (FOV) designed for close-up use. A user typically has to adjust the portable computing device (e.g., between different exercises) to allow their full body to be captured for motion tracking purposes.

For example, a user assumes an initial position and then has to position their body farther from the computing device to be fully captured by its camera, making it difficult to read on-screen instructions or see visual feedback. As another example, the user adjusts the position or orientation at which the computing device is placed between exercises to accommodate the capturing of their full body across a range of exercise types (e.g., standing exercises and floor-based exercises). The user may, for instance, have to move the computing device from the floor and place it on a higher surface, such as a table, or carefully adjust the angle at which it is placed against a wall to compensate for the narrow FOV when transitioning from a first exercise type to a second exercise type.

These limitations can create a conflict between motion tracking accuracy and user interface accessibility. In addition to potentially compromising user experience, the technical limitations can lead to inconsistency in the manner in which input is captured by the portable computing device, introducing additional complexity and increasing the likelihood of errors in motion tracking.

Examples in the present disclosure seek to address such technical challenges and obviate the need for the aforementioned compensatory actions. In some examples, digital therapy is facilitated by a portable computing device with image sensors having optical characteristics selected to provide an expanded FOV. The portable computing device can make it easier to achieve full-body capture for human motion tracking, can reduce or even eliminate the need for angular adjustments between exercises, and can provide such full-body capturing while positioned at a distance that still enables comfortable viewing of on-screen content.

Methods described herein can ensure that images are captured at a substantially fixed vertical axis. For example, the portable computing device can be used together with, or incorporate, a support member that holds the portable computing device in a substantially vertical orientation. Such a support member can improve stability and reduce inconsistency in camera orientation relative to a user, thereby facilitating improvements in motion tracking accuracy. In some examples, the support member helps to reduce or avoid the need for height or angular adjustments between exercises or exercise sessions.

The capturing of images at a substantially fixed vertical axis, as described in examples herein, can further improve motion tracking by providing for more accurate depth perception. For example, when using conventional portable computing devices, a technical problem can arise in establishing a consistent reference plane for computer vision computation due to the ad hoc or dynamic nature of device usage, particularly across different users. In examples in the present disclosure, a more consistent reference plane is provided, helping a digital therapy platform to determine depth information.

In addition to the aforementioned technical challenges, front-facing cameras of portable computing devices can struggle to capture images of sufficient quality, especially in poor or variable lighting conditions, which affects the accuracy or reliability of motion tracking. For example, users often use these devices in home environments where lighting conditions vary significantly.

Subject matter in the present disclosure can address or alleviate this challenge through a dual-camera system that simultaneously captures images at different exposure levels. Pairs of images may be processed to generate high dynamic range (HDR) image data, helping a digital therapy application to perform well across variable lighting conditions (e.g., by reducing the occurrence of problems such as motion artifacts).

The present disclosure uses the terms "digital therapy," "digital therapy platform," and "session." As used herein, the term "digital therapy" may include a broad spectrum of health and wellness therapies, interventions, plans, programs, or activities delivered at least partially through digital means. Digital therapy may be aimed at addressing or diagnosing specific conditions and/or aimed at promoting physical fitness or well-being and/or aimed at preventative care. Accordingly, digital therapy may include targeted therapeutic plans, such as those for musculoskeletal (MSK) rehabilitation, and pelvic-floor therapy, but may also include more general activities that are not necessarily linked to a specific therapeutic condition, such as general fitness-related exercises, strength exercises, or injury prevention. Digital therapy programs may be personalized and interactive, where activities are tailored to an individual's health objectives, whether for specific therapeutic purposes or more general purposes (such as fitness enhancement).

As used herein, the term "digital therapy platform" may include a technology-based or technology-driven platform designed to facilitate one or more health-related and/or wellness-related activities. As mentioned above with reference to "digital therapy," activities associated with a digital therapy platform may be aimed at addressing or diagnosing specific conditions and/or aimed at promoting physical fitness or well-being and/or aimed at preventative care. Accordingly, utilization of a digital therapy platform is not necessarily limited to diagnosing, treating, or managing specific conditions, as it may also be used for general or regular exercise (for example). A digital therapy platform may integrate or leverage various digital tools, such as mobile applications, web applications, wearable devices, motion trackers, other sensors, and/or interactive software to provide personalized solutions.

In the context of digital therapy or a digital therapy platform, the term "session," as used herein, may include a user engagement with the digital therapy platform. An engagement may involve the user performing one or more exercises based on instructions or guidance provided by the digital therapy platform, in which case the session can be referred to as an exercise session. A session may be tailored to address a specific health condition (e.g., through targeted exercises). In some cases, a session may be aimed at supporting general wellness, prevention, or fitness goals, without being targeted to a specific condition. Accordingly, a session may involve targeted or general exercises, depending on a user's needs or selections.

An example method includes accessing images of a full body of a user captured by a first image sensor and a second image sensor of a portable computing device. In some examples, the portable computing device is a tablet device, and the image sensors are provided by a front-facing camera assembly thereof.

In some examples, the images are captured while the portable computing device is positioned in a substantially vertical orientation and while the user is performing one or multiple exercises. The images may be captured while a support member, such as a support stand, holds a front face of the portable computing device in the substantially vertical orientation. The support member can be provided separately from the portable computing device (e.g., as part of a digital therapy kit) or can be integrally formed with the portable computing device.

The images can be processed in real-time to generate HDR image data and positional information, such as depth information associated with body parts of the user. Using such HDR image data and resultant positional information, the portable computing device can generate real-time motion tracking data. In some examples, initial motion tracking data is obtained from the HDR image data and such initial motion tracking data is adjusted (e.g., updated, refined, or corrected) using the depth information.

In some examples, the first image sensor and the second image sensor simultaneously capture pairs of images at different exposure levels. The HDR image data may be generated for each pair of images by a process comprising aligning a first image from the first image sensor with a second image from the second image sensor to obtain aligned image data, and generating a final image using the aligned image data. For example, the first image is processed to align it with the second image, thereby obtaining aligned image data in the form of a processed or aligned version of the first image. Then, to generate the final image, the processed or aligned version of the first image is combined with the (unprocessed) second image using one or more operations, such as exposure fusion or tone mapping.

The determination of depth information may comprise generating a depth map to estimate a distance between one or more body parts of the user and the portable computing device. In some examples, determining the depth information comprises performing stereoscopic correction using a first image from the first image sensor and a second image from the second image sensor. The generation of motion tracking data may include analyzing body landmarks of the user while the user performs the exercises.

Various machine learning techniques can be utilized by the digital therapy platform. For example, trained machine learning models are executed to perform HDR image generation, to generate depth information, and/or to perform pose tracking.

The portable computing device can allow the user to perform multiple different exercises while capturing the full body of the user, without angular adjustment of the portable computing device being performed between the different exercises. For example, the user performs a first exercise in a substantially upright position in front of the portable computing device, a second exercise performed in a supported position in front of the portable computing device, and a third exercise performed in a floor-based position in front of the portable computing device. Examples of the first exercise include standing shoulder raises, arm extensions, and squats in which the user maintains a substantially upright posture. Examples of the second exercise include seated rows, seated marches, seated knee flexion, seated trunk flexion/extension, or chair-assisted balance exercises where support or partial support is utilized. Examples of the third exercise include floor-based planks, supine leg lifts, or prone back extensions where the user is positioned horizontally on the floor.

In some examples, each of the first image sensor and the second image sensor has a focal length and sensor size selected to provide a suitable diagonal FOV (DFOV), horizontal FOV (HFOV), and/or vertical FOV (VFOV). In some examples, the DFOV is greater than 110 degrees, the HFOV is greater than 90 degrees, and the VFOV is greater than 70 degrees. In some examples, the focal length is less than 2 mm.

In various examples, the DFOV is greater than 130 degrees, 140 degrees, 150 degrees, or 160 degrees. In various examples, the HFOV is greater than 100 degrees or 110 degrees. In various examples, the VFOV is greater than 100 degrees, 110 degrees, or 120 degrees.

In some examples, the first image sensor and the second image sensor are respective front-facing cameras that are spaced apart along a longitudinal axis of the portable computing device. For example, the sensors are spaced apart at a baseline of between 15 millimeters (mm) and 65 mm. The image sensors may be located in an upper region of a front face of the portable computing device. The portable computing device may be a substantially rectangular tablet device, and the first image sensor and the second image sensor may be front-facing cameras positioned at or adjacent to a long edge of the portable computing device.

The portable computing device may include a display screen, such as a display screen of at least 10 inches (e.g., at least 25.4 centimeters (cm) diagonally). The example method may include displaying, on a display screen of the portable computing device and while the user is performing the exercises, a user interface comprising a digital video feed. The digital video feed can represent the captured images together with at least one of motion tracking output or instructions for performing the exercises. The motion tracking can include real-time feedback regarding the performance of the exercises (e.g., based on pose tracking performed by a digital therapy application on the portable computing device).

FIG. 1

FIG. 1 is a diagrammatic representation of a networked computing environment 100, including a digital therapy platform 102, in which some examples of the present disclosure may be implemented or deployed. One or more servers in a server system 104 provide server-side functionality via a network 106 to a networked device, in the example form of a computing device 108 that is accessed by a user 110. The computing device 108 may be a portable computing device, such as a tablet device or a mobile phone.

A web client 112 (e.g., a browser) or a programmatic client 114 (e.g., an "app") may be hosted and executed on the computing device 108. In some examples, the computing device 108 executes further web clients or programmatic clients, such as the programmatic client 116 shown in broken lines in FIG. 1.

The one or more servers in the server system 104 also provide server-side functionality via the network 106 to a computing device 118 that is accessed by a therapist 120. The computing device 118 can, for example, be a personal computer, a laptop, a tablet device, or a mobile phone.

The therapist 120 may be a physical therapist or other person involved with digital therapy who assists the user 110 via one or more digital channels. The networked computing environment 100 may thus include a device of a user and a device of a therapist. Although not shown in FIG. 1, the computing device 118 may include a web client or a programmatic client similar to the web client 112 or programmatic client 114 (or the programmatic client 116) of the computing device 108.

The user 110 may be a person who engages with the digital therapy platform 102 to benefit from any of its features, or to seek guidance, support, or interventions. A user may have a specific medical condition that needs to be addressed, or may utilize digital therapy for more general purposes or regular exercise. The user may be assigned to a particular therapist.

The therapist 120 may be a physical therapist, clinician, physician, healthcare professional, or other worker (e.g., a personal trainer) that treats, manages, communicates with, or otherwise assists with advising, planning, guiding, motivating, treating, or rehabilitating a user in a digital therapy context. For example, in the context of the present disclosure, the therapist 120 can be a person assigned to work with the user 110 by offering advice, designing or adapting digital therapy programs, and/or providing motivation and support. In some examples, the therapist 120 can have multiple users assigned to them.

An Application Programming Interface (API) server 126 and a web server 122 provide respective programmatic and web interfaces to components of the server system 104. An application server 124 hosts or provides a digital therapy platform 102, which may also be referred to as a digital therapy system, and which includes subsystems, components, modules, or applications.

The computing device 108 and the computing device 118 can each communicate with the application server 124, for example, via the web interface supported by the web server 122 or via the programmatic interface provided by the API server 126. It will be appreciated that, although a single computing device 108 of the user 110 and a single computing device 118 of the therapist 120 are shown in FIG. 1, a plurality of other devices may be communicatively coupled to the server system 104 in some examples. For example, multiple users may use their respective devices to access the digital therapy platform 102, and multiple therapists may use their respective devices to access the digital therapy platform 102. Further, while certain functions are described herein as being performed at either a user device (e.g., web client 112 or programmatic client 114) or the server system 104, the location of certain functionality either within a user device or the server system 104 may be a design choice.

The application server 124 is communicatively coupled to one or more database servers 128, facilitating access to one or more information storage repositories (e.g., a database 130). In some examples, the database 130 includes storage devices that store information to be processed or transmitted by the digital therapy platform 102.

The application server 124 accesses application data (e.g., application data stored by the database servers 128 or database 130) to provide one or more applications to the computing device 108 and the computing device 118 (e.g., via a web interface 132 or an app interface 134). The digital therapy platform 102 may provide a digital therapy application, or multiple digital therapy applications, to be accessible via the computing device 108 or the computing device 118.

For example, the user 110 accesses a user portal of the digital therapy application to utilize various functionality, such as consulting virtually with the therapist 120, receiving a customized digital therapy program, receiving details of exercises to perform, receiving real-time feedback and instructions while performing exercises, interacting with the digital therapy platform 102 (e.g., providing input and receiving response messages), and reviewing educational content, while the therapist 120 may access a therapist portal of the digital therapy application to utilize various functionality, such as consulting virtually with the user 110, accessing a therapy workflow in a user management user interface, tracking and managing users.

Where multiple digital therapy applications are provided, different aspects of digital therapy may be provided via the respective applications. In some examples, a first application (e.g., the programmatic client 114) is a mobile application that provides an app interface (e.g., the app interface 134) for features such as educational videos, cognitive behavioral therapy (CBT), and a communication channel with therapists, while a second application (e.g., the programmatic client 116) is a tablet application that provides access to exercises and an app interface (e.g., the app interface 136) for such purposes. The digital therapy application is referred to herein primarily as a single application for ease of reference and to facilitate understanding of aspects described herein. It will, however, be appreciated that, where this disclosure may refer to a single "digital therapy application" having certain functions, such functions may be performed by a single application or distributed across multiple applications. The digital therapy application, or applications, may be mobile applications, tablet applications, web applications, combinations thereof, or other types of applications.

To access the digital therapy application provided by the digital therapy platform 102, a user may create an account or access an existing account with a service provider associated with the server system 104 (e.g., a digital health services provider). The user 110 or the therapist 120 can, in some examples, access the digital therapy application using a dedicated programmatic client (e.g., the programmatic client 114 and/or 116), in which case some functionality may be provided client-side, and other functionality may be provided server-side.

Data stored in the database 130 may include various motion data, therapy data (e.g., exercise data), performance data, or user data. It is noted that any biometric data or personally identifiable information (PII) is captured, collected, or stored upon user approval only, and deleted on user request. Further, such data is used for limited purposes and only for those purposes authorized by a user. To ensure limited and authorized use of biometric information or PII, access to this data is restricted to authorized personnel only, if at all. In addition, appropriate technical and organizational measures are implemented to ensure the security and confidentiality of this sensitive information.

The server system 104 may include multiple of the databases 130. Data stored in the database 130 or databases 130 may originate from various data sources. The data sources may include structured data and/or unstructured data. User data of the user 110 stored in the database 130 or databases 130 may include, for example, data describing a therapy goal of a user, data describing a baseline condition of the user, data describing changes in a condition of the user, motion data of the user, or performance data of the user related to one or more sessions. Examples of the performance data include data relating to range of motion, exercise types, exercise completion data, or movement accuracy.

The server system 104 may further host a machine learning system 138. The machine learning system 138 may be used to implement one or more aspects of a machine learning pipeline. For example, the machine learning system 138 may include components enabled to train models based on historic data, fine-tune models, or deploy models for inference. Various aspects of machine learning pipelines and other AI-related features are described elsewhere.

The machine learning system 138 may leverage one or more machine learning models to perform functions as described herein, such as performing computer vision tasks, generating real-time feedback, generating personalized recommendations for the user 110 (e.g., for review by the therapist 120) and/or generating personalized messages for the user 110.

The machine learning models may include models used in computer vision tasks, such as motion tracking, pose estimation, pose tracking, depth estimation, and so forth. Such models may include one or more of Convolutional Neural Networks (CNNs) (e.g., ResNet-based architectures, Hourglass Networks such as Stacked Hourglass Networks, Mask R-CNN, etc.), Recurrent Neural Networks (RNNs) including Long Short-Term Memory (LSTM) networks or Gated Recurrent Units (GRUs), DeepLab models (e.g., DeepLabv3+), U-Net models, SegNet, Pyramid Scene Parsing Network (PSP), Transformer models such as Vision Transformer (ViT), Spatial Transformer Networks, Graph Convolutional Networks (GCNs), Optical Flow models such as FlowNet or PWC-Net, OpenPose, PoseNet, AlphaPose, DeepPose, DensePose, YOLO-Pose, SimpleBaseline, Mask R-CNN, MoveNet, BlazePose by Google™, VoxelPose, VIBE (Video Inference for Human Body Pose and Shape Estimation), Multi-person Pose Estimation models and/or techniques such as Associative Embedding or PersonLab, and so forth. For example, a keypoint generation component of the digital therapy platform 102 (e.g., implemented locally at the computing device 108 via the digital therapy application) can make use of a pose estimation model such as BlazePose to process images captured by the computing device 108.

The machine learning models may include generative machine learning models, such as one or more language models. As an example, a large language model (LLM) is a machine learning model trained on vast amounts of data to enable it to process inputs and generate language and, in some cases, other types of content to perform a wide range of tasks. An LLM is able to perform these functions due to its large number of parameters (e.g., billions) enabling it to capture, for example, patterns in language. In some examples, an LLM serves as an engine for natural language processing tasks within a digital therapy system. The machine learning system 138 may leverage one or more LLMs to perform a variety of functions to support the operation of the digital therapy platform 102. These functions may include the generation of personalized recommendations to better manage therapy or personalized feedback, the interpretation of input and queries, and the synthesis of complex data into comprehensible reports.

The machine learning system 138 may employ a combination of machine learning models that are internally hosted or employed at a user device, e.g., for operations that benefit from rapid processing, and externally hosted machine learning models for operations that can benefit from the scalability and computational power of cloud-based services. Furthermore, the machine learning system 138 is designed to be flexible and scalable, enabling the integration of new models as they become available or as the needs of the digital therapy platform 102 evolve.

In some examples, third-party applications can communicate with the application server 124 via the programmatic interface provided by the API server 126 (or via another channel). For example, a third-party application may support one or more features or functions on a website or platform hosted by a third party, or may perform certain methodologies and provide input or output information to the application server 124 for further processing or publication. For example, the application server 124 may utilize functionality of machine learning models that are hosted by servers external to the server system 104.

The network 106 may be any network that enables communication between or among machines, databases, and devices. Accordingly, the network 106 may be a wired network, a wireless network (e.g., a mobile or cellular network), or any suitable combination thereof. The network 106 may include one or more portions that constitute a private network, a public network (e.g., the Internet), or any suitable combination thereof.

FIG. 2

Figure 2:
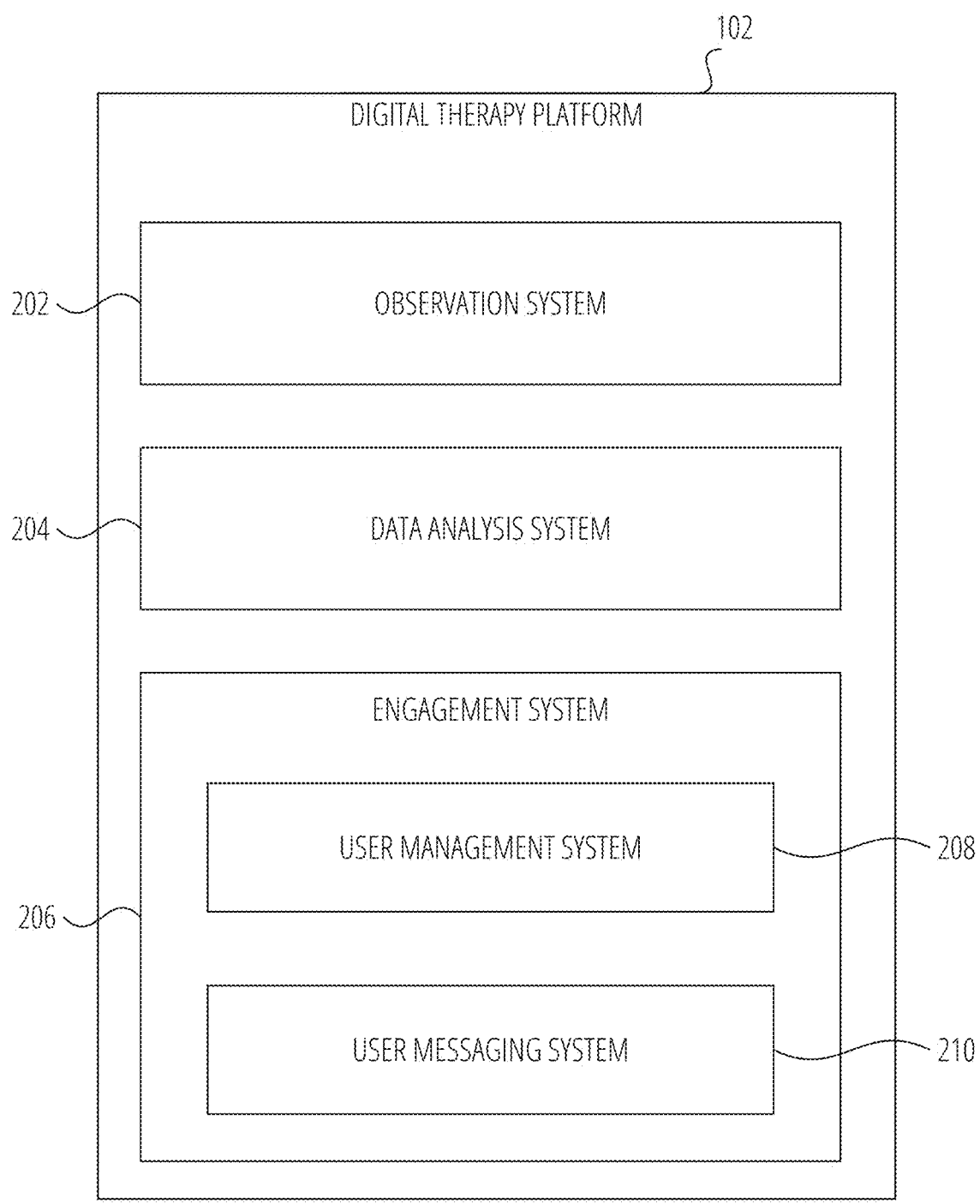
FIG. 2 is a block diagram illustrating systems within a digital therapy platform, according to some examples.

FIG. 2 illustrates systems within the digital therapy platform 102 of FIG. 1, according to some examples. In FIG. 2, the digital therapy platform 102 is shown to include an observation system 202, a data analysis system 204, and an engagement system 206. The engagement system 206 includes a user management system 208 and a user messaging system 210. In some examples, through the combination of systems such as those shown in FIG. 2, the digital therapy platform 102 provides end-to-end, AI-powered digital therapy. Functions of the observation system 202, the data analysis system 204, and the engagement system 206 can be performed at a remote server, locally at a user device or therapist device, or combinations thereof.

The observation system 202 captures multidimensional data through hardware and sensing technology. In some examples, the observation system 202 is designed to create an up-to-date and comprehensive view of user status and behavior that serves as the foundation for downstream clinical decision-making.

In some examples, the observation system 202 collects and processes image data from the computing device 108, such as image data captured by the computing device 108 during exercise sessions. In some examples, the observation system 202 accesses images of a full body of the user 110 captured by the computing device 108. The observation system 202 may process these images to generate HDR image data and determine positional information associated with the user.

The observation system 202 may perform pose estimation to identify and track body landmarks of the user 110 in real-time during exercise performance. This may involve analyzing the image data and positional information to create a skeletal representation, a segmentation mask, and/or a heat map of the positioning of the body of the user that can be used for movement analysis. The observation system 202 can track landmarks across different exercise types.

The observation system 202 can include a pose estimation component employing one or more pose detection and/or pose regression models, as made available by frameworks, APIs, or systems such as OpenPose, PoseNet, AlphaPose, DeepPose, DensePose, YOLO-Pose, Mask R-CNN, MoveNet, TensorFlow Pose estimation, MediaPipe Pose, BlazePose by Google™, and so forth. In some examples, a pose estimation component uses a keypoint-based pose detection and/or keypoint-based pose regression model. For example, the observation system 202 can run a BlazePose model that uses 33 such keypoints covering head region keypoints (e.g., facial features, ears, etc.) and body joints.

In some examples, the observation system 202 collects further data through other hardware, such as wearable devices (e.g., wearable motion trackers or biosensors), or through other means such as user feedback. The observation system 202 may provide comprehensive observational data for accurate clinical assessment and personalized therapeutic guidance in remote settings.

The data analysis system 204 executes decision-making through a multi-layered approach. In some examples, the data analysis system 204 processes the information collected by the observation system 202 to extract clinical insights and generate status or recommendation data. The data analysis system 204 can operate in real-time (e.g., to allow for feedback during an exercise session) and/or in response to certain triggers.

For example, the data analysis system 204 can respond to clinical triggers that signal potential changes in user status, such as enrollment of a new user requiring initial assessment, completion of a session generating new data, periods of non-engagement indicating potential adherence issues, user communications containing clinically relevant information, scheduled reassessment intervals based on clinical protocols, or significant changes in behavioral patterns detected by monitoring systems.

The data analysis system 204 can include various components, such as a session analyzer that evaluates sessions to extract meaningful clinical insights. The session analyzer can include a machine learning model that is fine-tuned for its specific function and type of input data. For example, the session analyzer analyzes body landmarks to evaluate exercise form and performance metrics.

Another example component of the data analysis system 204 is a behavioral analyzer, which examines activities and behavioral patterns outside structured sessions. For example, the data analysis system 204 can analyze signals from wearable technology and other interactions to develop insights into the user's daily functioning and adherence to recommendations. The data analysis system 204 may also analyze patterns over time to track progress and identify potential issues in the user's movement patterns.

A further example component of the data analysis system 204 is a conversational insights collector. Such a component of the data analysis system 204 may analyze verbal or text-based interactions between the user 110 and the digital therapy platform 102. Such interactions can be between the user and a human therapist (e.g., the therapist 120) or an AI-driven assistant (e.g., an "AI care specialist," or "digital therapist"). The data analysis system 204 can operate to identify clinically or engagement relevant information embedded within casual conversation, distinguishing between conversational pleasantries and clinically significant information.

The data analysis system 204 can also implement a clinical evaluator component and a clinical recommender component. For example, the clinical evaluator serves as an integrative component that synthesizes available information into a comprehensive clinical assessment. It performs holistic reasoning that seeks to mirror a clinician's thought process when reassessing a user (e.g., where the user is a patient of the clinician), incorporating clinical history, recent session analyses, behavioral data, conversational insights, and established clinical guidelines.

The clinical recommender may represent the culmination of a reasoning process executed by the data analysis system 204 (e.g., an AI agent-driven reasoning process). The clinical recommender can seek to generate an optimal or near-optimal course of action for a user based on the aforementioned process. This can include therapy adjustments, behavioral recommendations, or clinical escalation recommendations when appropriate. In some examples, outputs from the data analysis system 204 are reviewed by a human therapist and are only implemented after human therapist approval.

The engagement system 206 focuses on interactions with the user 110, which may include those on behalf of the therapist 120. In some examples, the engagement system 206 allows for interactions with the user 110 during sessions and aims to drive engagement in various stages of treatment.

The engagement system 206 may provide real-time feedback and guidance based on motion tracking data generated by the observation system 202 and/or the data analysis system 204. The engagement system 206 may display, on a display screen of the computing device 108 and while the user is performing exercises, a user interface comprising a digital video feed with motion tracking output, responses to user queries, or instructions for performing exercises.

The engagement system 206 may include different conversation agents (e.g., language model-based agents) for various purposes, including agents with state machine flow control. This may include guardrail agents that employ language models as judges and content revision mechanisms to help with content safety. The engagement system 206 may also incorporate retrieval augmented generation (RAG) databases to allow for factual and up-to-date information communication, as well as speech-to-text and text-to-speech algorithms.

In some examples, the user management system 208 handles the overall administration of therapy programs. The user management system 208 tracks user progress across multiple sessions, manages exercise prescriptions, and adjusts therapy parameters based on performance data (e.g., together with the data analysis system 204). The user management system 208 is configured to work with the data analysis system 204 to process user data and detect events, such as completion of a session, arrival of a new chat message, or lack of user engagement for a predetermined number of days. When such events occur, the user management system 208 works with the data analysis system 204 to recommend actions or interventions.

The user management system 208 can inform the therapist 120 of a proposed initial prescription based on baseline data (e.g., individual characteristics, clinical conditions, user needs, and goals). The user management system 208 can also monitor progress over time and introduce tailored prescription adjustments, presenting recommended modifications for therapist review and approval. In some examples, the user management system 208 provides, to the therapist 120, a user interface with information and recommendations related to the user 110.

The user messaging system 210 facilitates communication between users and the digital therapy platform 102 (e.g., its therapists or AI systems). In some examples, the user messaging system 210 enables asynchronous messaging between users and their therapists, allowing for questions, feedback, and guidance outside of scheduled sessions. The user messaging system 210 may be responsible for in-session interactions with the user, generating personalized messages delivered at certain points in time, and automatically responding to queries during a session.

In some examples, when interacting with the user in real time during a session, the user messaging system 210 generates and transmits messages rapidly using AI technology, simulating the role of a human therapist working with and encouraging the user in real time. The user messaging system 210 can also deliver messages originating from the user management system 208, such as motivational messages recommended by the user management system 208 (e.g., as approved by the therapist 120).

In some examples, when the user messaging system 210 interacts directly with the user 110 without live human supervision (such as by using an "AI care specialist" to interact with the user during sessions), state-machine-driven language model orchestration is employed. This breaks down complex procedures into multiple steps, forcing an AI system (e.g., a language model-based agent) to follow one step at a time while using it to determine the next step based on user input. This approach may combine the model's ability to handle natural language with the rigorous flow that a state machine provides.

The engagement system 206 can utilize generative machine learning models, such as an LLM, to generate personalized recommendations or personalized messages. For example, the engagement system 206 dynamically generates a prompt including user data and an instruction for generating a personalized recommendation or message. The prompt may then automatically be provided to a generative machine learning model (e.g., an LLM) to obtain the personalized recommendation or message, substantially in real-time. Prompt engineering may be employed to describe the task to the model, incorporating, for example, movement statistics and relevant past information from user history. This can result in feedback or recommendations that are more appropriate to the patient's situation and also motivational, acknowledging improvements and encouraging continued effort. Such models can also be used to respond, in real-time, to questions or queries received from users.

FIG. 3

Figure 3:
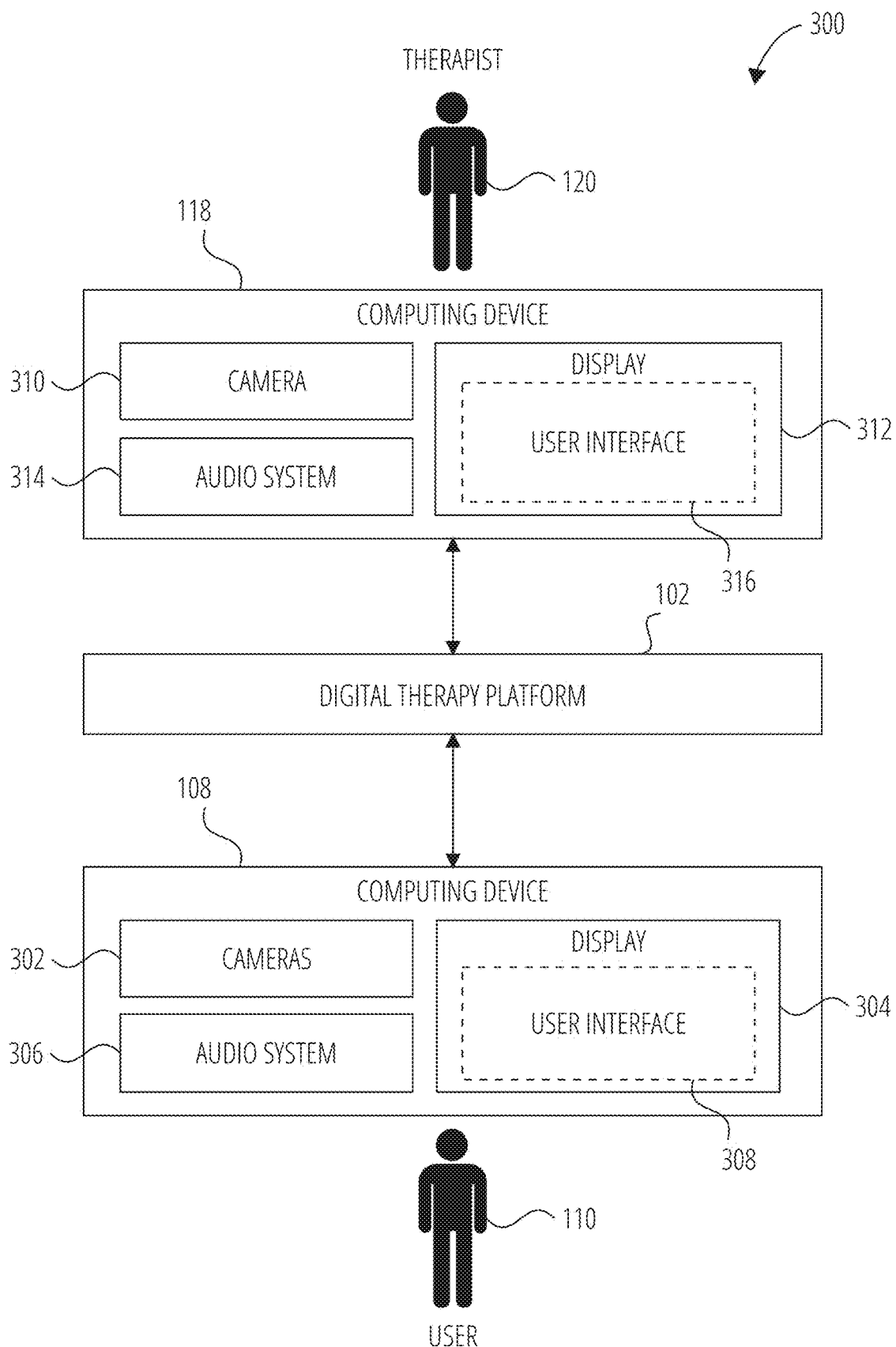
FIG. 3 is an interaction diagram illustrating interactions between computing devices in the context of a digital therapy platform, according to some examples.

FIG. 3 shows an interaction diagram 300 depicting interactions between a user device of a therapist (e.g., a physical therapist), the digital therapy platform 102 of FIG. 1, and a user device of a user, according to some examples. In FIG. 3, the computing device 118 of the therapist 120 of FIG. 1 and the computing device 108 of the user 110 of FIG. 1 are shown for ease of reference. It will be appreciated that similar interactions may be performed with other devices connected to the digital therapy platform 102. It will further be understood that only a few selected components of the computing device 108 and the computing device 118 are shown in FIG. 3 to describe certain functionality, and that the computing device 108 and the computing device 118 may include numerous other components.

As discussed with reference to FIG. 1, both the computing device 108 and the computing device 118 are devices that can communicate with or operate as part of the digital therapy platform 102 (e.g., by accessing a digital therapy application). In at least some embodiments, the computing device 108 and the computing device 118 may be mobile phones, tablets, personal computers, or combinations thereof.

The computing device 108 includes, or is connected to, cameras 302, a display 304, and an audio system 306. The computing device 108 further includes at least one processor, at least one memory, and a communication module (not shown) for communicating with the digital therapy platform 102 and one or more other devices.

The cameras 302 may capture images or video content of the user 110 performing exercises to allow tracking of user motion via computer vision techniques. For example, identification of anatomical landmarks, measurement of distances, and tracking of body parts may be performed using computer vision techniques such as those described elsewhere in the present disclosure.

The cameras 302 and other components of the computing device 108 (e.g., microphone loudspeaker of the audio system 306 as well as communication modules) may also facilitate virtual consultations. The user 110 may connect with the therapist 120 via the digital therapy platform 102, for example, to virtually consult with the therapist 120. The display 304 is used to provide a user interface 308 of the digital therapy platform 102, such as a user interface of the digital therapy application.

The audio system 306 may, for example, include one or more microphones and one or more loudspeakers or modules for connecting to external microphones and/or loudspeakers. This enables the user 110 to provide input to the digital therapy platform 102 in audio format and to receive audio messages from the digital therapy platform 102.

The user 110 may, for example, enter user data, such as demographic information, clinical history, and symptoms (e.g., identification of painful zones and pain levels), and the data is then transmitted to the digital therapy platform 102. The digital therapy platform 102 may generate (e.g., automatically or with assistance from the therapist 120) a digital therapy program and make it available to the user 110. For example, the digital therapy platform 102 can be a physical therapy program that guides the user 110 through an 8-week program or a 12-week program to treat or improve Lower Back Pain (LBP) or another MSK condition through targeted physical therapy (the actual duration may vary or be dynamic, for example, based on user condition, engagement, or recovery trajectory).

The computing device 108 may provide (or cause another device to provide) user-perceptible signals, such as exercise instructions or messages. For example, the display 304 and one or more loudspeakers of the audio system 306 may provide such user-perceptible signals. That is to say, the computing device 108 may comprise one or more of visual output means, audio output means, vibrating means, or other means for providing user-perceptible signals in the form of sounds, vibration, animated graphics, etc.

For example, the display 304 of the computing device 108 may show instructions and/or information to the user 110 about the digital therapy program, such as predetermined movements that are to be performed by the user 110 or results of the exercises performed by the user 110 presented via the user interface 308. The computing device 108 may thus provide the user interface 308 to present instructions and/or information to the user and/or to receive inputs from the user.

Any of these data can be transmitted to and/or received from another electronic device thanks to communicative couplings between the computing device 118, the digital therapy platform 102, and the computing device 108 (e.g., over the network 106 of FIG. 1). For example, the therapist 120 is able to receive the feedback at the computing device 118 in a hospital or other facility, such as an outpatient clinic, retirement home, or elderly care facility, or even at their home, so as to monitor the evolution or progress of the user 110.

In some examples, the computing device 108 captures audio feedback via one or more audio sensors such that the audio feedback can be processed by the computing device 108 or at the digital therapy platform 102 (e.g., to assist in determining the ease or difficulty experienced by the user 110 in performing the exercises). In some examples, while the user 110 is performing exercises, the computing device 108 provides real-time messages from an AI care specialist and the user 110 is enabled to respond verbally to such messages. For example, the user 110 responds, the digital therapy platform 102 processes the response via one or more AI agents, generates a follow-up response, and transmits the follow-up response back to the user 110 via the computing device 108.

Examples of the computing device 108 and kits that may include the computing device 108 are described with reference to FIG. 4 to FIG. 6.

In some examples, the user 110 is provided with additional sensors or trackers. For example, the user 110 may be provided with one or more body-mounted trackers and/or one or more biosensors or vital sign sensors. Such sensors or trackers can include one or more Inertial Measurement Unit (IMUs) and one or more components for detecting or measuring biological or physiological signals from the body. Examples of such sensors include a respiration rate sensor, a body temperature sensor, a pulse rate sensor, or a combination of two or more thereof. Sensors can be incorporated into a wearable device such as a watch or wristband.

The therapist 120 can manage, edit, or track the digital therapy programs of one or various users on the computing device 118. For example, based on sensor measurements, user-reported feedback, and AI generated analyses received with respect to the user 110, the therapist 120 is able to monitor and adjust the digital therapy program by changing the difficulty of the movements or exercises, changing the number of repetitions thereof, prescribing new movements, and so forth. The therapist 120 may make such adjustments based on AI-generated recommendations (e.g., from the data analysis system 204 or engagement system 206 of FIG. 2).

In some examples, the digital therapy platform 102 provides for bidirectional communication with users, for example, through a secure chat functionality or a text messaging facility available when the digital therapy application is installed on the computing device 118 and the computing device 108. This may enable, for example, virtual consultations or text message-based "chats" between users and therapists (human therapists or an AI care specialist).

The computing device 118 also includes, or is connected to, a camera 310 and audio system 314, for example, to facilitate such communications. As discussed with reference to the computing device 108, the computing device 118 also includes a display 312, at least one processor, at least one memory, and a communication module (not shown) for communicating with the digital therapy platform 102 and one or more other devices.

A user interface 316 may be provided to the therapist 120 via the display 312 (e.g., a user interface of the digital therapy application). A user management user interface may allow the therapist 120 to track, manage, and/or interact with various users assigned to them in the context of the digital therapy platform 102. For example, the user management user interface can be implemented via the user management system 208 of FIG. 2.

For example, after authenticating into the digital therapy platform 102 (e.g., logging into the digital therapy application), the therapist 120 can access the user interface 316 for their assigned users (e.g., the user 110). The user interface 316 may enable the therapist 120 to visualize baseline information, changes in user data over time, including, for example, measured range of motion (e.g., using computer vision techniques), self-reported pain ratings (e.g., a reported pain level after each session), utilization data, and/or fatigue levels. The user interface 316 can also provide predicted risk alerts, next steps, tasks, and/or timeline views of exercise activity to assist the therapist 120.

The user interface 316 may enable the therapist 120 to prescribe physical therapy interventions by selecting exercise regimens (these may be referred to as "prescriptions") and scheduling follow-ups. In some examples, the user interface 316 is dynamically and automatically adjusted or updated to reflect the current state of the user 110 based on the latest measurements and predictions.

The user interface 316 may provide automatically-generated content. As described with reference to FIG. 2, in some examples, the digital therapy platform 102 processes user data from various sources and automatically generates recommendations that are personalized for each user. The digital therapy platform 102 can leverage generative AI techniques to generate such personalized recommendations and then automatically surface them to the therapist 120 within the user interface 316. In some examples, the automatically-generated recommendations are provided in the user interface 316. For example, the therapist 120 can access a profile of the user 110 within the user interface 316 to view and act on (e.g., approve, modify and approve, or reject) personalized recommendations that were automatically generated for the user 110.

FIG. 4

Figure 4:
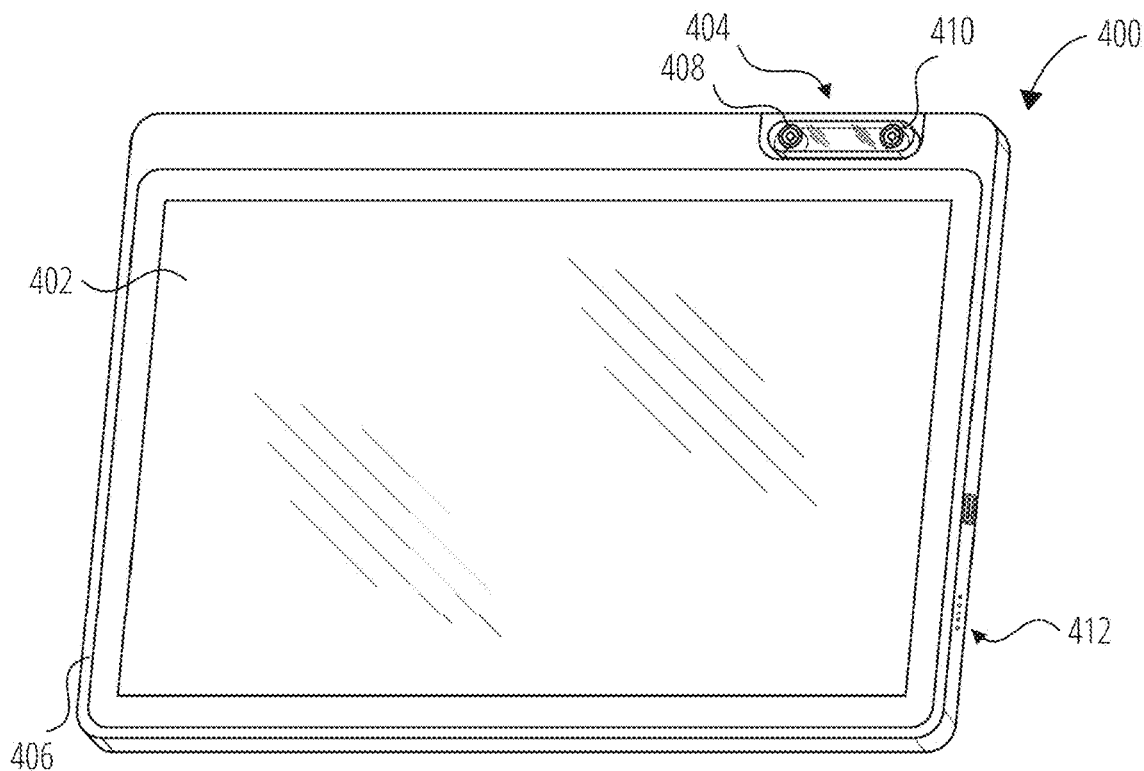
FIG. 4 is a perspective view of a portable computing device, according to some examples.

FIG. 4 shows a portable computing device 400, according to some examples. The portable computing device 400 may be used by a user of a digital therapy platform, such as the user 110 of the digital therapy platform 102 of FIG. 1.

The portable computing device 400 is a substantially rectangular tablet device designed to facilitate digital therapy. The portable computing device 400 includes a display 402, a camera assembly 404, and a bezel 406 surrounding the display 402 and into which the camera assembly 404 is integrated.

Figure 10:
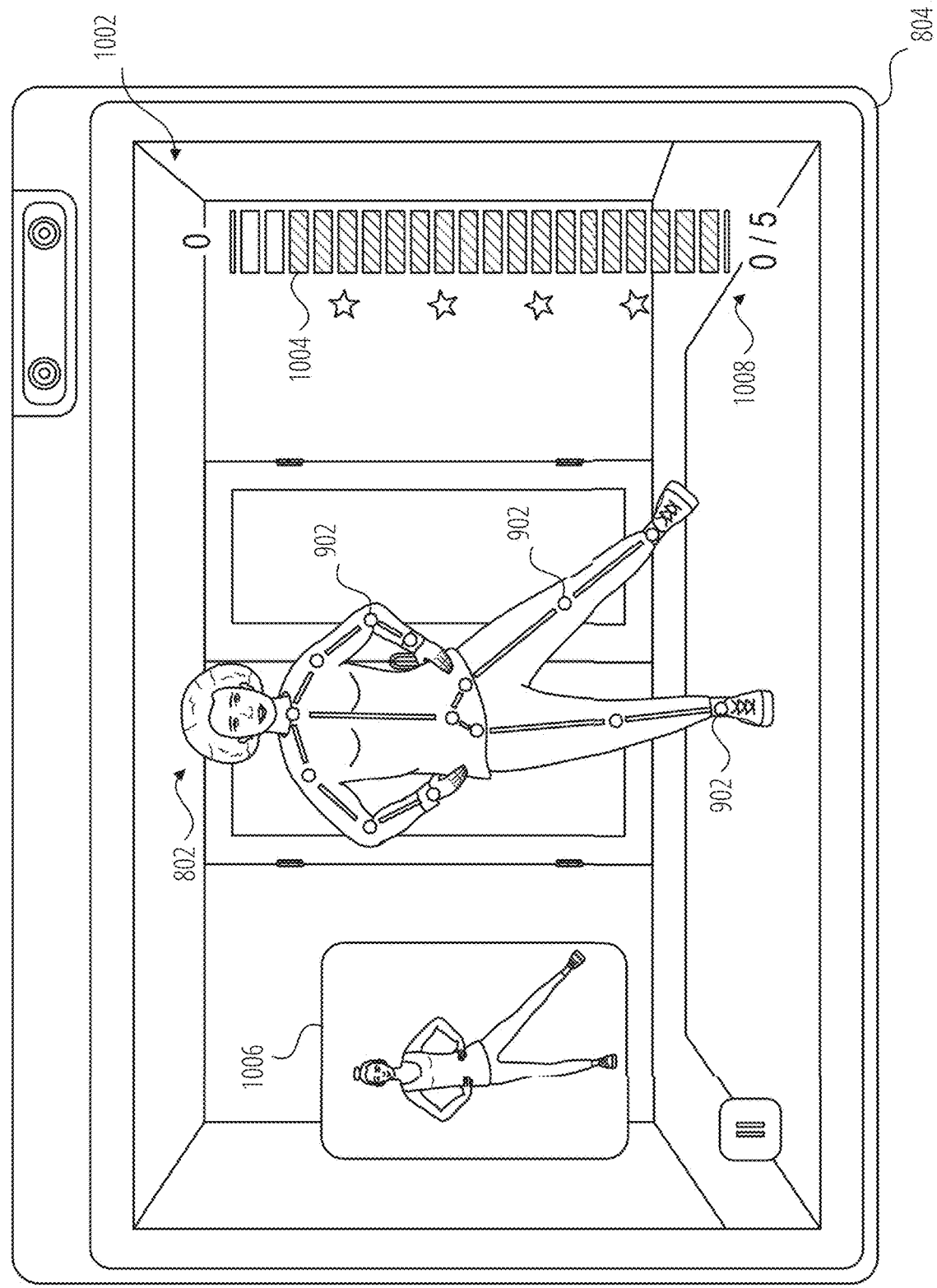
FIG. 10 is a user interface diagram illustrating example data presented via a user interface provided by the portable computing device of FIG. 8, according to some examples.
Figure 11:
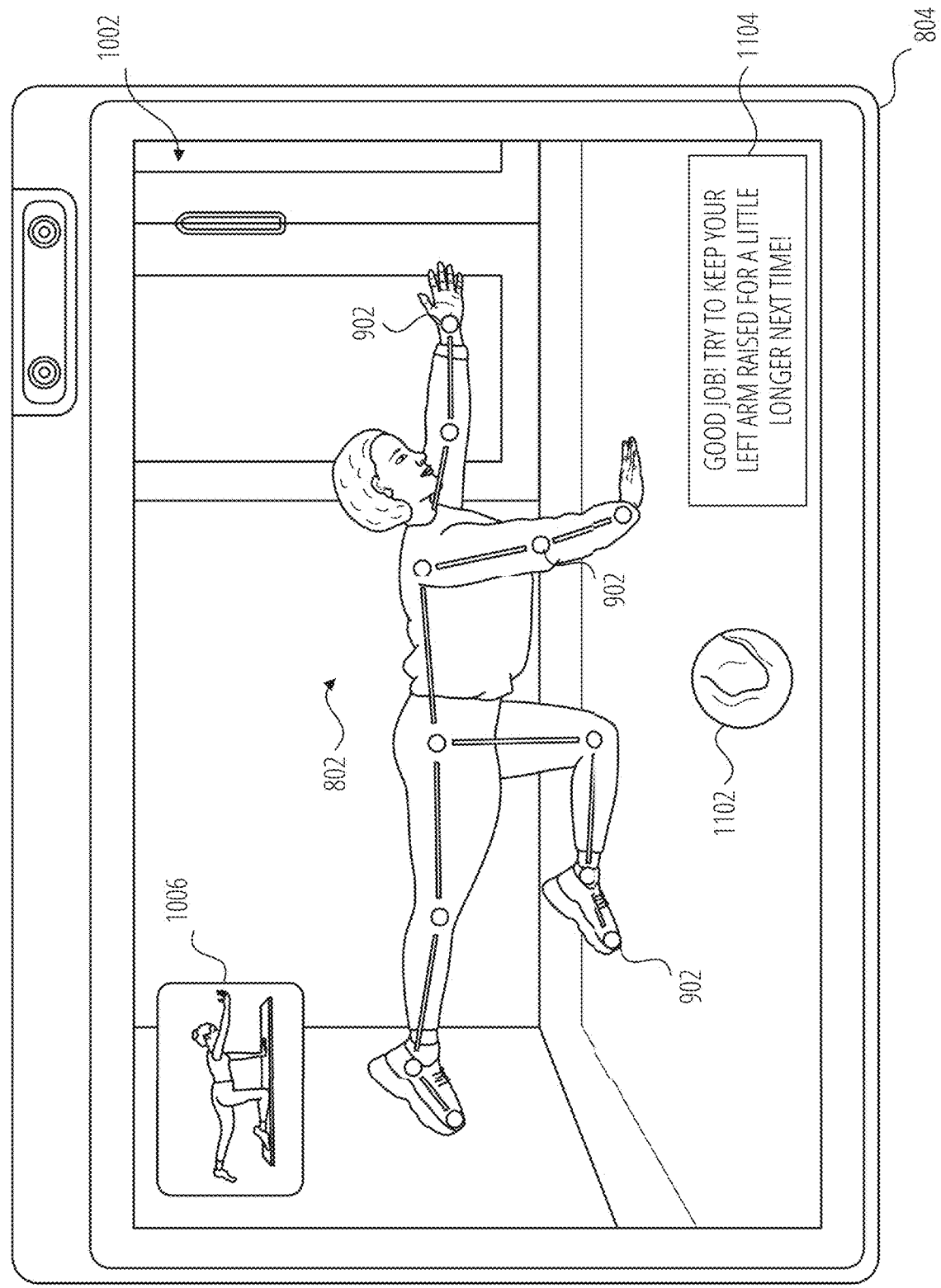
FIG. 11 is a further user interface diagram illustrating example data presented via the user interface provided by the portable computing device of FIG. 8, according to some examples.

The display 402 provides a visual interface for a user (e.g., the user 110 of FIG. 1), examples of which are shown in FIG. 10 and FIG. 11. In some examples, the portable computing device 400 executes a digital therapy application and the display 402 presents a user interface of the digital therapy application. The digital therapy application can present a digital video feed representing images captured by the camera assembly 404 together with motion tracking output or instructions for performing exercises.

In some examples, the display 402 includes a touchscreen, such as a Liquid Crystal Display (LCD) or Organic Light-Emitting Diode (OLED) panel with a touch-sensitive layer. In the example of FIG. 4, the display 402 provides an active area of approximately 135.4 mm×316.6 mm.

The camera assembly 404 provides stereoscopic, wide-angle lenses capable of capturing movements across a range of exercise types (e.g., standing, supported, and floor-based) and in variable lighting conditions. Specifically, in this example, the camera assembly 404 is positioned in an upper portion of the portable computing device 400 and includes a first camera 408 and a second camera 410. The first camera 408 and the second camera 410 are front-facing cameras that are spaced apart along a longitudinal axis of the portable computing device 400. In this example, the first camera 408 and the second camera 410 are spaced apart at a baseline of approximately 29 mm (taken from image sensor center to image sensor center).

In this example, the first camera 408 and the second camera 410 each have a focal length and sensor size selected to provide a DFOV of approximately 165 degrees, with a VFOV of around 130 degrees, and an HFOV of around 110 degrees. The first camera 408 and the second camera 410 can, for example, each have a focal length of 1.66 mm, providing a wide angle, and an f/2.4 aperture (e.g., fixed aperture).

For example, the spacing between the first camera 408 and the second camera 410 helps with triangulation and accurate depth perception, while the large FOV allows a user to remain fully in frame while positioned sufficiently close to view the display 402. In some examples, the camera properties and spacing enable wide-angle motion capture while allowing for both high dynamic range (HDR) image processing and stereoscopic depth calculation.

The bezel 406 forms the outer frame of the portable computing device 400 and provides structural support. In some examples, the bezel 406 is designed to mate with a support stand to hold the portable computing device 400 in a substantially vertical orientation, as discussed further below.

The portable computing device 400 further includes audio components, such as speakers 412 and one or more microphones (not shown). For example, the portable computing device 400 can include noise-canceling and/or echo-canceling microphones to help with voice recognition in noisy environments. The portable computing device 400 also includes one or more processors, memory, storage, a battery (e.g., rechargeable lithium-ion type) and multiple ports, such as a USB-C port and a headphone jack.

The specifications such as FOV, focal length, and aperture size are provided as an illustrative example above and other specifications are possible. For example, another portable computing device may provide a DFOV of approximately 120 degrees, a VFOV of approximately 77 degrees, and an HFOV of approximately 98 degrees.

FIG. 5 and FIG. 6

Figure 5:
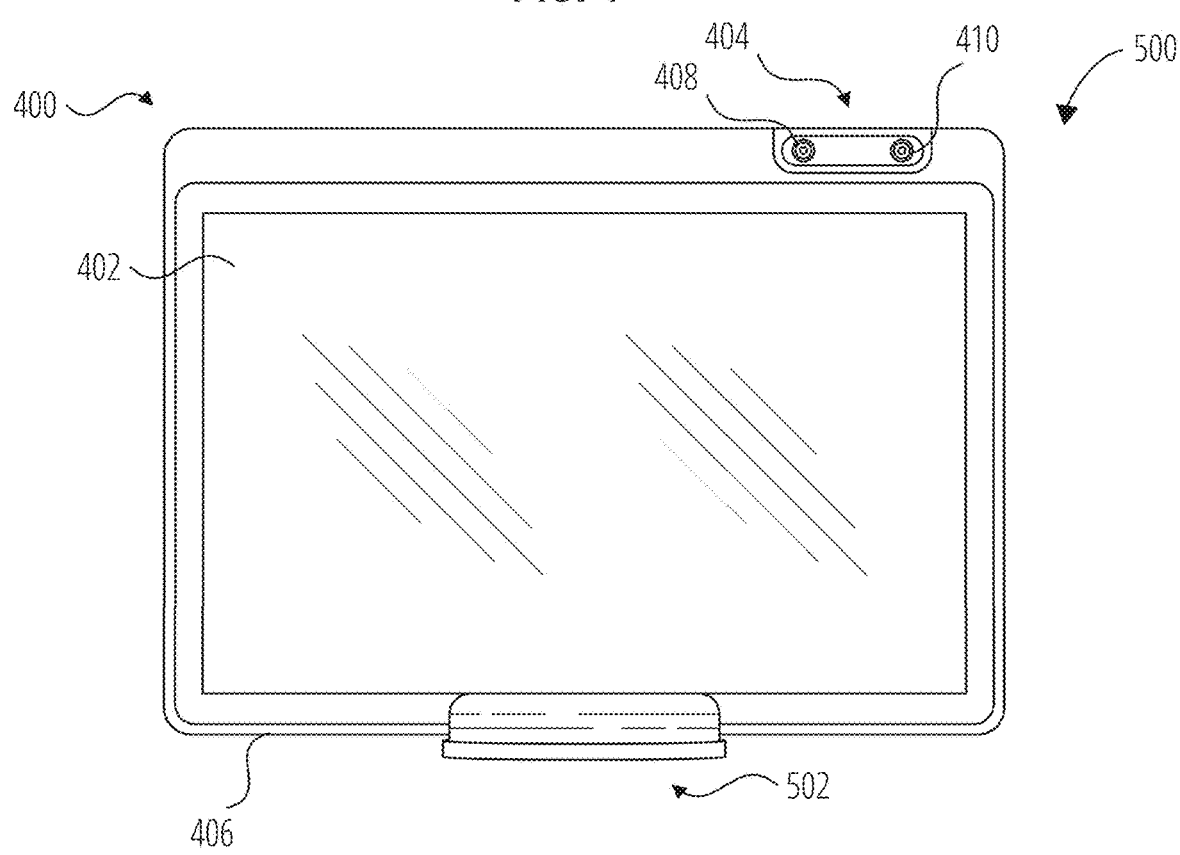
FIG. 5 is a front view of a kit that includes the portable computing device of FIG. 4 and a support stand, according to some examples.
Figure 6:
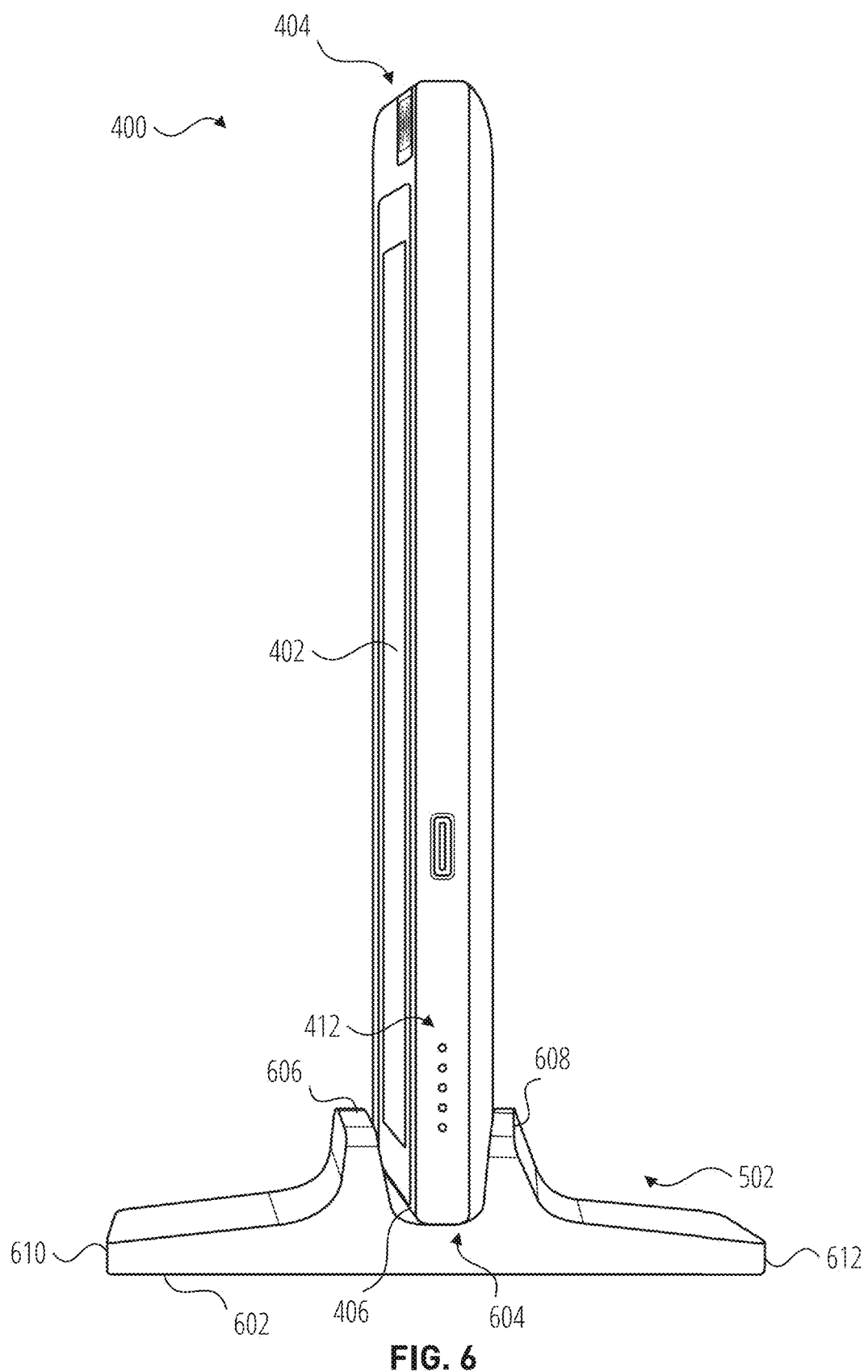
FIG. 6 is a side view of the kit of FIG. 5, according to some examples.

FIG. 5 and FIG. 6 show a kit 500 that includes the portable computing device 400 of FIG. 4 and a support stand 502, according to some examples. The kit 500 can provide, or form part of, a motion tracking system used in context of the digital therapy platform 102. While the kit 500 is shown in an in-use condition in FIG. 5 and FIG. 6, the portable computing device 400 and the support stand 502 may be provided separately to a user (e.g., the user 110).

The support stand 502 is designed to hold the portable computing device 400 in a substantially vertical orientation. The support stand 502 includes a base 602 that provides stability. The base 602 is designed to have a relatively wide footprint to reduce the risk of tipping when the portable computing device 400 is mounted in position. The base 602 has a flat bottom surface and can rest on various external surfaces, such as on a table, a floor, or a counter.

The support stand 502 defines a slot 604 that is shaped to receive the portable computing device 400 along its length. In some examples, the slot 604 has dimensions selected so as to allow it to mate effectively with the bezel 406, as shown in FIG. 6. The slot 604 is defined by a pair of spaced apart flanges 606 and 608 that extend upwardly from the slot 604 in a central region of the support stand 502, with the support stand 502 tapering downwardly from the flanges 606 and 608 to respective lateral edges 610 and 612.

When in position and with the base 602 of the support stand 502 placed on a flat surface, the support stand 502 holds the portable computing device 400 upright in a substantially vertical orientation (e.g., at about 90 degrees relative to the flat bottom surface provided by the base 602 of the support stand 502). In some examples, the support stand 502 helps to maintain a consistent reference plane for computer vision computations. The support stand 502 may be used to position the portable computing device 400 at one or various heights while maintaining proper alignment for tracking. This can reduce the need for manual angle adjustments regardless of the exercise type or device placement.

In some examples, the support stand 502 includes charging elements that enable charging of a battery of the computing device 400 when mating with the support stand 502. For example, charging elements can be integrated into the slot 604. Spring-loaded contacts (e.g., pogo pins) or other electrical contacts may be positioned to align with corresponding connectors on the portable computing device 400 when it is inserted into the slot 604. This allows the portable computing device 400 to charge while maintaining the substantially vertical orientation for motion tracking.

In some examples, instead of a separate support stand such as the support stand 502, the portable computing device 400 has an integrally formed support or stabilization structure (e.g., a set of legs) that helps to position it substantially vertically, in use. Regardless of the support structure that is utilized, the fixed vertical orientation obtained by using such structure may provide stability and a more consistent reference plane for computer vision, for example, reducing the complexity of depth estimation computations (e.g., as compared to other implementations in which the orientation of the device relative to the horizontal is less certain). This may facilitate, for example, estimating movement of the user since the a priori knowledge of a capturing device's vertical axis orientation can simplify the computations required to track three-dimensional movement, potentially also reducing processing time and memory usage. Providing a fixed or known tablet orientation can simplify or improve the accuracy of algorithms such as stereoscopy algorithms.

In some examples, the wide-angle cameras (e.g., provided by the first camera 408 and the second camera 410) in combination with the vertical position (e.g., provided by the support stand 502) enable versatility in user positioning. For example, when the portable computing device 400 is placed on a suitable surface (e.g., a table) using the support stand 502, a user can choose to position themself closer to the portable computing device 400 compared to what would have been possible in conventional digital therapy technologies. For example, depending on the placement of the portable computing device 400, the user could position themselves within 1 m or even closer (e.g., within 0.8 m) of the portable computing device 400 while still being fully captured within the FOV (e.g., full-body image capture by both the first camera 408 and the second camera 410). This close positioning may help users to clearly see the display and receive real-time feedback while performing exercises. Moreover, when compared to conventional digital therapy technologies, the wide-angle configuration may also help the user to more easily switch between different exercise types (e.g., switching from a standing position to a horizontal lying position relative to the portable computing device 400) while remaining fully within the FOV, without adjustment to the portable computing device 400.

FIG. 7

Figure 7:
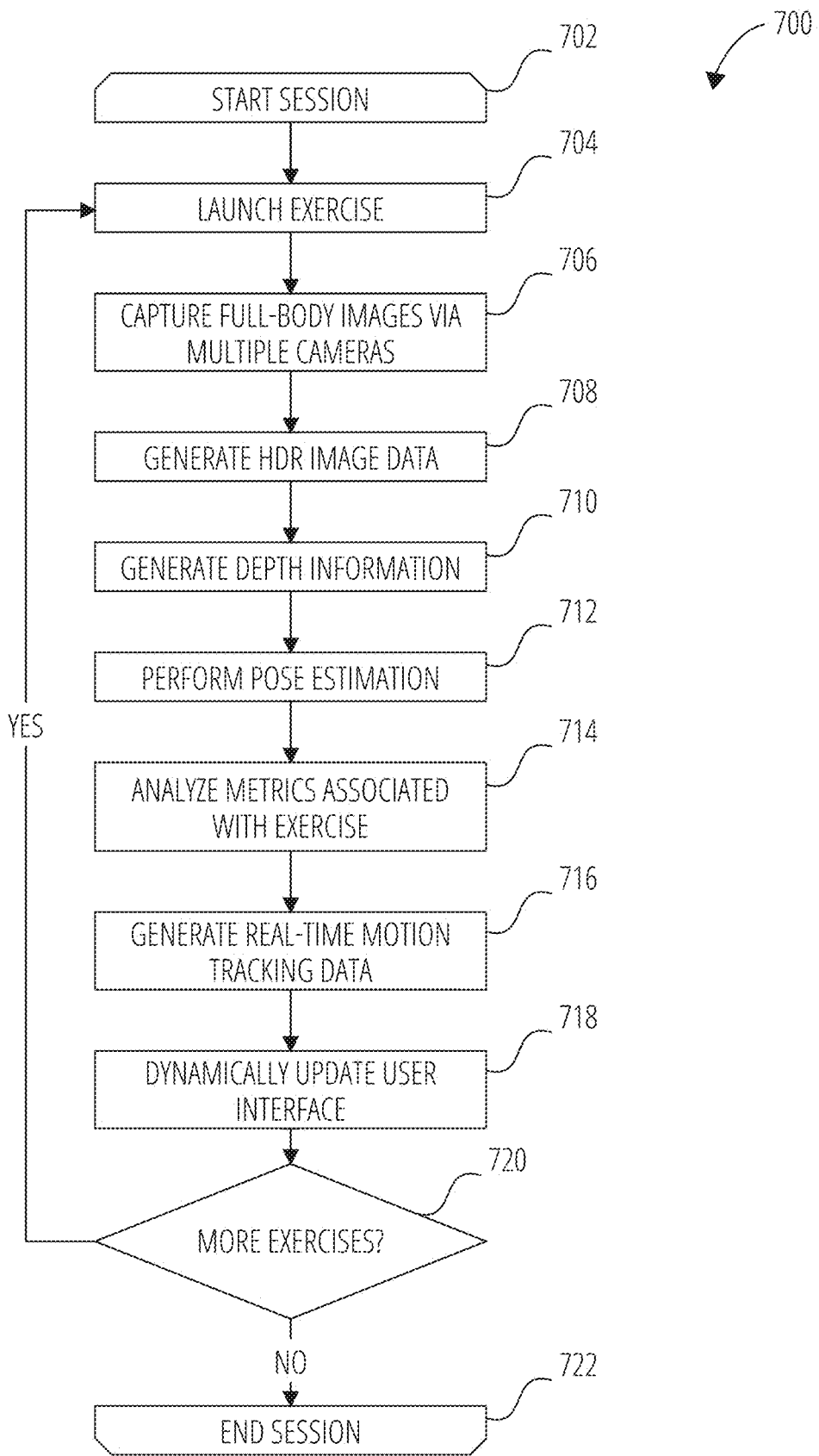
FIG. 7 is a flowchart illustrating a method of generating motion tracking data for a digital therapy session, according to some examples.

FIG. 7 illustrates a method 700 of generating motion tracking data for a digital therapy session, according to some examples. The method 700, as may be performed by the digital therapy platform 102 using components shown in one or more of FIG. 1 to FIG. 6, seeks to improve motion tracking and user experience in a digital therapy setting. To illustrate the method 1200, the portable computing device 400 and the support stand 502 of FIG. 4 to FIG. 6 are referenced below as example hardware leveraged by the digital therapy platform 102.

The method 700 includes starting a session at opening loop element 702. The digital therapy platform 102 initiates a new session when a user (e.g., the user 110 of FIG. 1) logs in, opts to start, or when a scheduled session time arrives. For example, the user uses the portable computing device 400 to run the digital therapy application. The digital therapy platform 102 may load the user's profile (e.g., as part of the digital therapy application), including scheduled exercises and historical data from previous sessions.

At operation 704, the digital therapy platform 102 launches an exercise. In some examples, the digital therapy platform 102 loads specific exercise parameters and instructions to guide the user through a particular movement. The exercise launch may include displaying visual instructions on the display 402 of the portable computing device 400.

At operation 706, the digital therapy platform 102 captures full-body images via multiple cameras while the user performs the exercise in question. Before starting the exercise, the user positions themselves so as to be in the FOV of the camera assembly 404, guided, for example, by a video feed displaying the user's positioning relative to the FOV, shown via the display 402.

With the user in the FOV, they start with the exercise. The first camera 408 and the second camera 410 of the portable computing device 400 capture images (e.g., through simultaneous capture) of the user while the portable computing device is positioned in a substantially vertical orientation, e.g., as a result of being mounted in the support stand 502, as the exercise progresses (e.g., as the user performs repetitions of a certain exercise type).

As mentioned, the first camera 408 and the second camera 410 are front-facing cameras that are spaced apart along a longitudinal axis of the portable computing device 400, providing both HDR processing capabilities and stereoscopic depth estimation capabilities. The wide-angle configuration of the camera assembly 404 may help the portable computing device 400 to capture the full body of the user without requiring them to position themselves at an impractical distance from the portable computing device 400 or make cumbersome angle or positional adjustments between exercises. In some examples, the images of the user are captured while the display 402 faces the user and displays instructions and/or exercise feedback. In some examples, the instructions and/or exercise feedback are displayed together with a video feed that shows the user as captured by the display camera assembly 404.

In some examples, during image acquisition, the image sensors of the camera assembly 404 capture pairs of images at different exposure levels. For example, the first camera 408 captures one image with a shorter exposure time or lower exposure level to detect bright areas and the second camera 410 captures one image with a longer exposure time or higher exposure level to better capture darker parts of the scene.

At operation 708, the digital therapy platform 102 generates HDR image data. For example, the portable computing device 400 processes the images captured by the first camera 408 and the second camera 410 by aligning a first image from the first camera 408 with a second image from the second camera 410, captured at different exposure levels and at the same time, to obtain aligned image data. For example, the first image is aligned with the second image to obtain an aligned version of the first image which can be merged with the original second image, or vice versa. Then, a final image can be generated through such merging using processing operations such as exposure fusion and tone mapping. As another example, the first image and second image can be aligned against a new reference, thereby obtaining aligned image data different from the original images that can be merged using the aforementioned processing operations.

Exposure fusion can involve analyzing pixel brightness and automatically selecting the best exposed parts from each image. Through the fusion process, the portable computing device 400 can examine the relative brightness of corresponding pixels in both images and selectively combine them to create a composite image with enhanced dynamic range. Through tone mapping, the portable computing device 400 can transform a final image into a displayable format that preserves the enhanced dynamic range.

Applying HDR techniques in the present context may improve image detail and thus allow for better downstream pose estimation and motion tracking. For example, HDR techniques can ultimately reduce errors in the estimations of the positioning of landmarks (e.g., body keypoints), reduce problems with jitter noise, or reduce the risk of landmark "switching" (e.g., an incorrect body part is assigned to a specific landmark or keypoint).

In some examples, the generation of the HDR image data can involve executing one or multiple machine learning models, either locally at the portable computing device 400 of the digital therapy platform 102 or remotely at the observation system 202 of the digital therapy platform 102. For example, a trained neural network can be executed to align the first and second images of each pair of images or to perform exposure fusion.

As an example, the generation of the HDR image data may involve implementing a deep neural network (DNN) architecture specifically designed for creating HDR content from multi-exposure low dynamic range (LDR) images captured by dual cameras. The portable computing device 400 employs a trained DNN to map images from the first camera 408 and second camera 410 to an irradiance domain based on their respective exposure times or exposure values. The irradiance information can provide a representation of light intensity that preserves a dynamic range useful for subsequent HDR reconstruction. The DNN architecture may incorporate specialized learning components that simultaneously handle two tasks: (1) aligning the images acquired at different exposure levels to compensate for spatial disparities between the cameras, and (2) merging information from these aligned images to reconstruct a comprehensive HDR image. The DNN can be trained using a large dataset of such multi-exposure images. This neural network-based approach may allow for adaptive handling of the complex relationships between different exposure levels while accounting for the spatial separation of the cameras.

At operation 710, the digital therapy platform 102 generates depth information associated with the user that is being tracked. In some examples, operation 710 leverages the stereoscopic capabilities enabled by the spacing between the first camera 408 and the second camera 410 to create a depth map that estimates the distance between body parts of the user and the portable computing device 400.

Since the cameras are spaced apart, objects in the images will not align perfectly. When aligning images from both cameras of the camera assembly 404, the portable computing device 400 can detect misalignments caused by the different camera positions. The amount and direction of misalignment depend on the distance between the portable computing device 400 and the object and various camera-related parameters. Using this misalignment data and triangulation techniques, the portable computing device 400 generates the depth map.

In some examples, a depth map is generated using a block-matching stereo correspondence algorithm that operates on images captured by first and second cameras. For example, for each pixel in a first image, the portable computing device 400 extracts a block of pixels (e.g., a 16×16 pixel region) surrounding the target pixel. The algorithm then searches horizontally along the corresponding line in the second image to find the best matching block based on similarity metrics such as sum of absolute differences or normalized cross-correlation. Once the best (or near-best) match is found, the algorithm computes a disparity value, which may be the horizontal distance between the location of the pixel in the first image and the location of its matching pixel in the second image. The depth ($Z$) is then calculated using the formula $Z=Bf/d$, where B represents the baseline distance between the two cameras (e.g., the physical separation between the first camera 408 and second camera 410), f is the focal length of the cameras, and d is the disparity value. Through such a process, the computer device 400 can create a comprehensive depth map with depth information where larger disparity values indicate objects closer to the cameras, while smaller disparity values represent objects that are farther away.

As mentioned, the images can be captured while the portable computing device 400 is at a substantially fixed vertical orientation. This can provide a consistent reference plane for depth calculations, which simplifies, for example, transformation computations required for accurate depth perception.

In some examples, depth estimation can involve executing one or more machine learning models. For example, a trained neural network can be executed to analyze the first and second images and generate a depth map.

In some examples, a depth map generation process using machine learning involves a multi-stage approach. A first stage implements a machine learning model that processes multiple images to determine temporal synchronization between frames captured by the first and second cameras. This model takes several images as inputs, and may output a capture delay value indicating a delay between cameras. Following temporal alignment, a second machine learning model processes the time-synchronized images to predict disparities between corresponding points across the multiple camera views. This model analyzes the spatial relationships between features in both images to generate disparity values. From there, with a reconstruction algorithm (which may also be machine learning-driven), it is possible to generate a depth map or a 3D point cloud with distances between cameras and the obtained points. Some implementations use convolutional neural network (CNN) architectures such as MVSNet (Multi-View Stereo Network), which may integrate a stereoscopic processing pipeline into a unified deep learning framework.

Stereoscopy can be applied to improve estimation of the movements in a plane that is perpendicular to the portable computing device 400 (e.g., in depth). These improvements in estimation of depth may in turn reflect in the quality of motion tracking and therefore, at least in some examples, to feedback given to the user.

In some examples, stereoscopic correction may involve analyzing temporal sequences of joint trajectories and leveraging anatomical constraints, such as consistent bone lengths, to detect and correct distortions caused by imperfect stereo camera calibration. A correction framework may employ geometry principles to resolve depth ambiguities between synchronized stereo views while dynamically refining camera extrinsics through optimization techniques. The portable computing device 400 can compensate for radial lens distortions, camera misalignment, and/or calibration inaccuracies. This approach may allow for more robust 3D pose reconstruction without precise pre-calibration.

A stereoscopic correction process may take, as inputs, the two camera images (e.g., from the first camera 408 and the second camera 410 respectively), initial camera calibration parameters (including intrinsics, rotation matrices, translation vectors, or distortion coefficients), and potentially a sequence of 2D joint positions detected in both views over time. The process may output rectified images, corrected camera parameters, and improved 3D joint position estimates. Stereoscopic correction may involve compensating for lens distortion, camera misalignment, and/or epipolar rectification to ensure accurate triangulation of 3D points from the stereo image pair, for example. The stereoscopic correction process may include one or more of camera calibration parameter optimization, which could involve refining the intrinsic parameters (e.g., focal length, principal point) and extrinsic parameters (e.g., rotation, translation) of the camera model to reduce reprojection errors. This correction step may enhance the quality and accuracy of resulting depth information.

At operation 712, the portable computing device 400 performs pose estimation. This operation may involve processing the HDR image data (and in some examples also depth information) to identify and track body landmarks of the user. For example, the pose estimation process uses computer vision techniques to map the user's body position in three-dimensional space, creating a skeletal representation that can be used for movement analysis. In some examples, the portable computing device 400 executes a machine learning model that generates 3D landmark positions from input image data. In such cases, the depth information generated at operation 710 can be used to supplement or improve the 3D landmark positions. In other examples, the portable computing device 400 executes a machine learning model that generates 3D landmark positions from input image data and input depth information. Examples of relevant computer vision models are described elsewhere in the present disclosure.

In some examples, results obtained from an initial pose estimation (e.g., based on the HDR image data) can be corrected, improved, or otherwise adjusted using the depth information of operation 710 (e.g., depth maps or depth estimation obtained by stereoscopy). In this way, the depth information can be applied in a post-processing algorithm for landmark detection, correction, and/or adjustment.

At operation 714, the portable computing device 400 analyzes metrics associated with the exercise. For example, the portable computing device 400 checks detected movement patterns, as observed from pose tracking, against predefined parameters for the specific exercise being performed. In some examples, the portable computing device 400 uses depth information generated at operation 710 as part of this analysis.

In some examples, the digital therapy platform 102 uses tracked landmarks, or keypoints, to analyze user movements. For example, the digital therapy platform 102 performs:

1. Exercise recognition: The digital therapy platform 102 identifies or confirms which specific exercise the user is performing.
2. Form analysis: The digital therapy platform 102 assesses the user's form by comparing the spatial relationships between keypoints against predefined parameters for the specific exercise. This may include measurements of range of motion, movement speed, joint angles, and/or overall form correctness. The digital therapy platform 102 may detect subtle compensatory movements that might indicate improper form or potential injury risk.
3. Progress tracking: The digital therapy platform 102 tracks changes in performance metrics over time to assess the user's progress in their program.

The portable computing device 400 generates real-time motion tracking data for the particular exercise at operation 716. For example, the portable computing device 400 dynamically synthesizes the results from the pose estimation and exercise metric analysis into a dataset that represents the user's movement or performance in real time. The motion tracking data includes temporal information that helps with continuous monitoring of exercise performance.

At operation 718, portable computing device 400 dynamically updates a user interface presented via the display 402 to reflect the motion tracking data. For example, the portable computing device 400 provides visual feedback to the user, such as through representations of the user's body position, movement trajectories, form guidance based on the analyzed metrics, or statistics.

At decision operation 720, after the exercise has been completed, the portable computing device 400 determines whether more exercises remain in the session. If additional exercises are scheduled, the process returns to operation 704 to launch the next exercise. If no exercises remain, the method 700 proceeds to closing loop element 722 where the session ends.

The digital therapy platform 102 ends the session, logs the session data for future reference, and may schedule the next session based on the user's program or schedule. The user may then log out or be logged out (e.g., of the digital therapy application as described above), or the portable computing device 400 shuts down. The digital therapy platform 102 may generate summary statistics of user performance, storing the collected data for future processing (e.g., by the data analysis system 204) and preparing final feedback for the user before closing the active session.

In some examples, a combination of hardware and software features provide technological benefits. For example, leveraging the optical features and vertical positioning of the portable computing device 400, the user can perform different types of exercises during the session while remaining comfortably close to the portable computing device 400 and without angular adjustments thereto (e.g., without having to tilt the portable computing device 400 up or down relative to the vertical axis). For example, standing exercises, supported exercises, and floor-based exercises can all be performed in the same session, without the user having to move in the depth direction relative to the portable computing device 400. Moreover, a consistent reference plane and high-quality image data are obtained, facilitating motion tracking (e.g., the generation of accurate motion tracking data). Improved motion tracking may, in turn, lead to more relevant and useful feedback to the user (e.g., as generated by the "AI care specialist" described with reference to FIG. 2).

While the method 700 has been described with reference to a dual camera system, it should be understood that at least some principles or techniques described herein may also be implemented in a single camera configuration. For example, a portable computing device may employ alternative techniques for generating HDR image data, such as capturing sequential images at different exposure levels, and may utilize other methods for depth estimation that do not rely on or benefit from stereoscopic principles, such as machine learning models trained to estimate depth from monocular images.

FIG. 8 and FIG. 9

Figure 8:
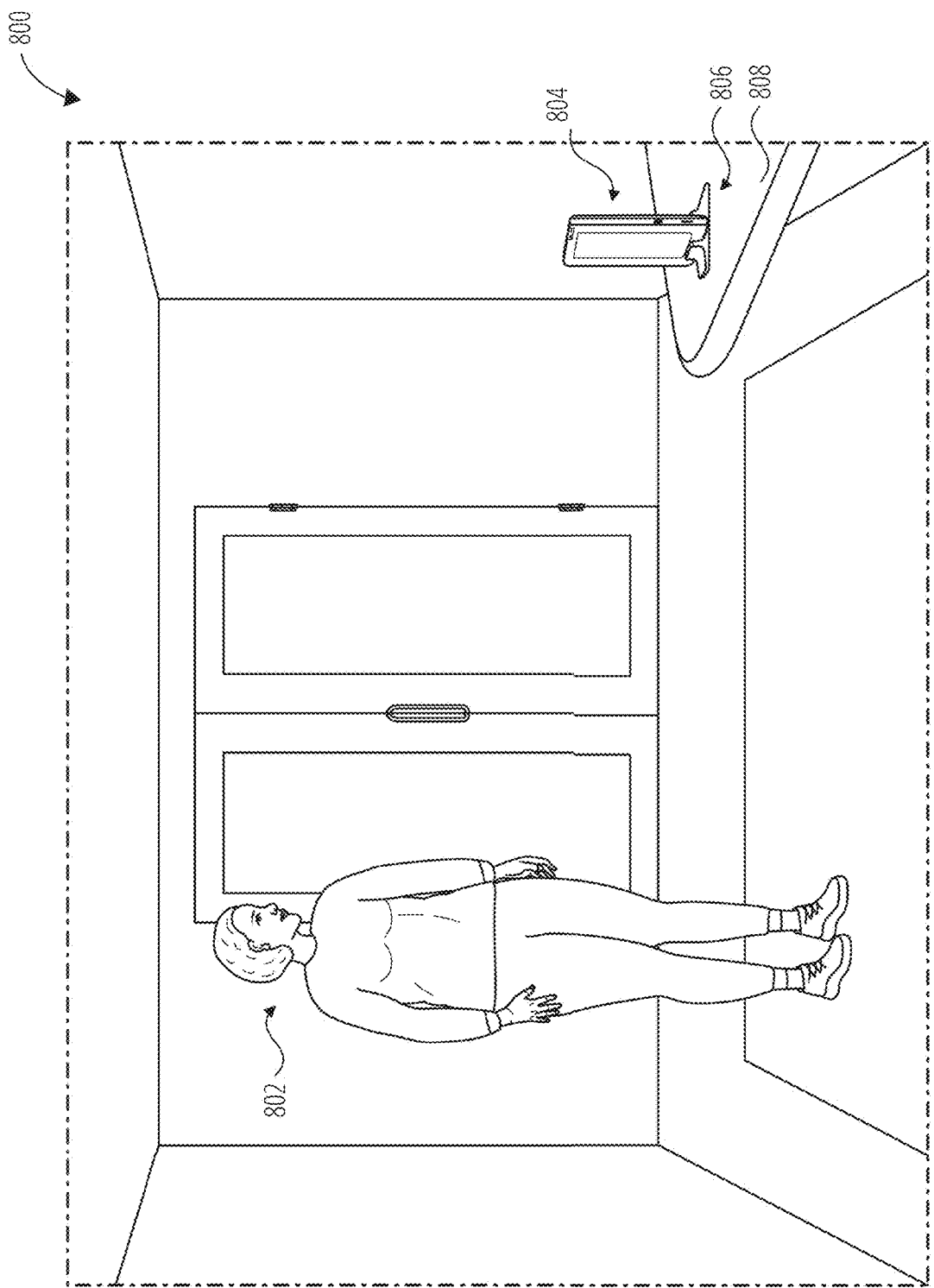
FIG. 8 is a perspective view of a user environment in which a portable computing device operates to facilitate motion tracking, according to some examples.
Figure 9:
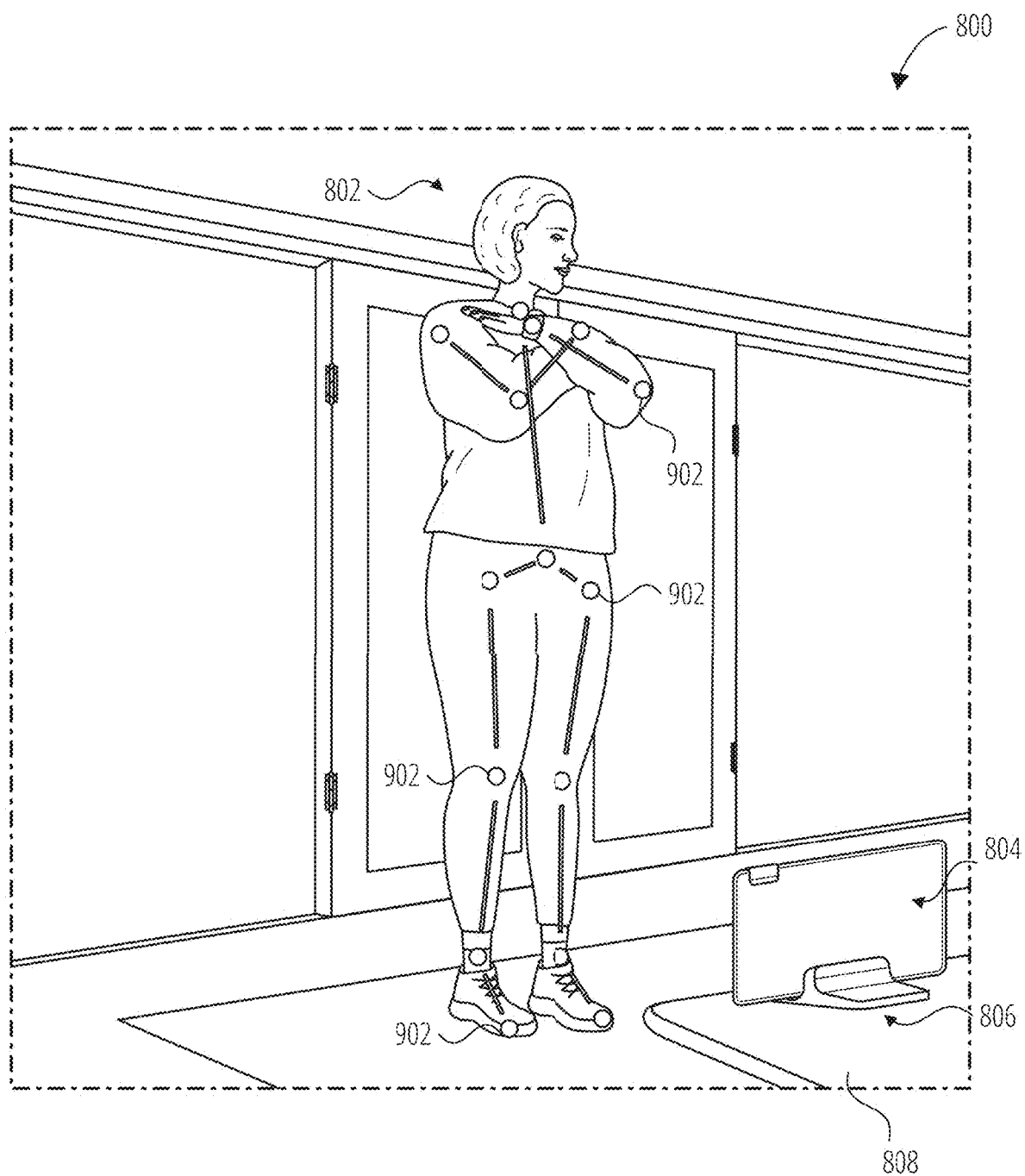
FIG. 9 is a perspective view of the user environment of FIG. 8 while a user is performing an exercise, according to some examples.

FIG. 8 and FIG. 9 illustrate a user environment 800 showing a user 802 with a portable computing device 804 and support stand 806 positioned on a surface 808, according to some examples. In FIG. 8, the user 802 is shown in a standing position in front of the portable computing device 804, which is held in position by the support stand 806, prior to starting with a session. The surface 808 is a table surface. The user 802 may set the portable computing device 804 up in this manner for the session, allowing the portable computing device 804 to capture images of the user 802 and generate motion tracking data.

FIG. 9 illustrates the user environment 800 from a different perspective and while the user 802 is performing an exercise during the session. FIG. 9 also shows keypoints 902 tracked during motion analysis, according to some examples. It is noted that the keypoints 902 are shown mainly for illustrative purposes and are not necessarily visible and/or not necessarily shown to the user 802 during operation.

In some examples, the portable computing device 804 is similar to the portable computing device 400 of FIG. 4, providing a large FOV for motion capture. The support stand 806 may be similar to the support stand 502 of FIG. 5 and FIG. 6, holding the portable computing device 400 upright substantially perpendicular to the surface 808.

The user 802 may be enabled to position themselves closer to the portable computing device 804 compared to what would have been possible in conventional digital therapy technologies. For example, the user 802 could position themselves within 1 m or even closer while still being fully captured within the FOV.

FIG. 10 and FIG. 11

FIG. 10 and FIG. 11 illustrate views of a user interface 1002, according to some examples. The user interface 1002 illustrates example data presented via a display of the portable computing device of FIG. 8, according to some examples.

Referring firstly to FIG. 10, FIG. 10 shows real-time visual feedback elements during exercise performance, according to some examples. The portable computing device 804 displays multiple elements in the user interface 1002 to guide and provide feedback to the user 802.

The user interface 1002 shows the user 802, as captured by the cameras of the portable computing device 804. In other words, the portable computing device 804 provides a real-time video feed to allow the user 802 to see themselves performing the relevant exercises. The user 802 is shown with the keypoints 902 overlaid onto their body. It is noted that the keypoints 902 are shown mainly for illustrative purposes and are not necessarily visible and/or not necessarily shown in the user interface 1002 during operation.

The user interface 1002 further presents real-time visual feedback elements 1004 (represented by bars and star symbols), and a real-time instructions section 1006 showing a smaller figure demonstrating the proper form for the relevant exercise. Thus, the user 802 can actively perform an exercise while watching their form on the display, while the portable computing device 804 is capturing and processing images in real time to provide immediate feedback on their performance. A progress tracker 1008 in the user interface 1002 of FIG. 10 shows how many exercises or repetitions of an exercise (depending on the setting) have been completed.

Turning now to FIG. 11, the user 802 has transitioned from the standing exercise of FIG. 10 to a floor-based exercise in which the user 802 is positioned horizontally (substantially parallel to the length of the portable computing device 804). In some examples, the expanded FOV of the portable computing device 804 allows the user 802 to switch between such different types of exercises seamlessly without having to move further away from the portable computing device 804 or adjust the angle of the portable computing device 804. In other examples, the user 802 does adjust a height at which the portable computing device 804 is positioned, while the portable computing device 804 remains at the same angle (e.g., upright and held in position by the support stand 806). For example, the user 802 positions the portable computing device 804 and support stand 806 on a table for standing exercises and on a floor for floor-based exercises.

In addition to the real-time instructions section 1006 and the live feed of the user 802, the user interface 1002 shows an AI care specialist element 1102. The AI care specialist element 1102 indicates that an AI care specialist, such as an AI-driven automated assistant or "digital therapist," is providing guidance during exercise performance. For example, the circular icon may be visually updated to indicate when the AI care specialist is "talking," with audio output being emitted at the same time via the portable computing device 804 to convey the AI care specialist's message to the user 802. The user 802 can respond by asking questions or providing instructions, as described in greater detail elsewhere in the present disclosure.

In some examples, in addition or as an alternative to the AI care specialist element 1102 indicating audio output, the user interface 1002 can show text output 1104. For example, the portable computing device 804 can output a text version of the AI care specialist's message to the user 802 as shown in FIG. 11. As mentioned, the user 802 may be able to position their body relatively close to the computing device 804 while still allowing for full-body capture. As a result, the user 802 may be able to read the text output 1104 more easily than in other implementations.

FIG. 12

Figure 12:
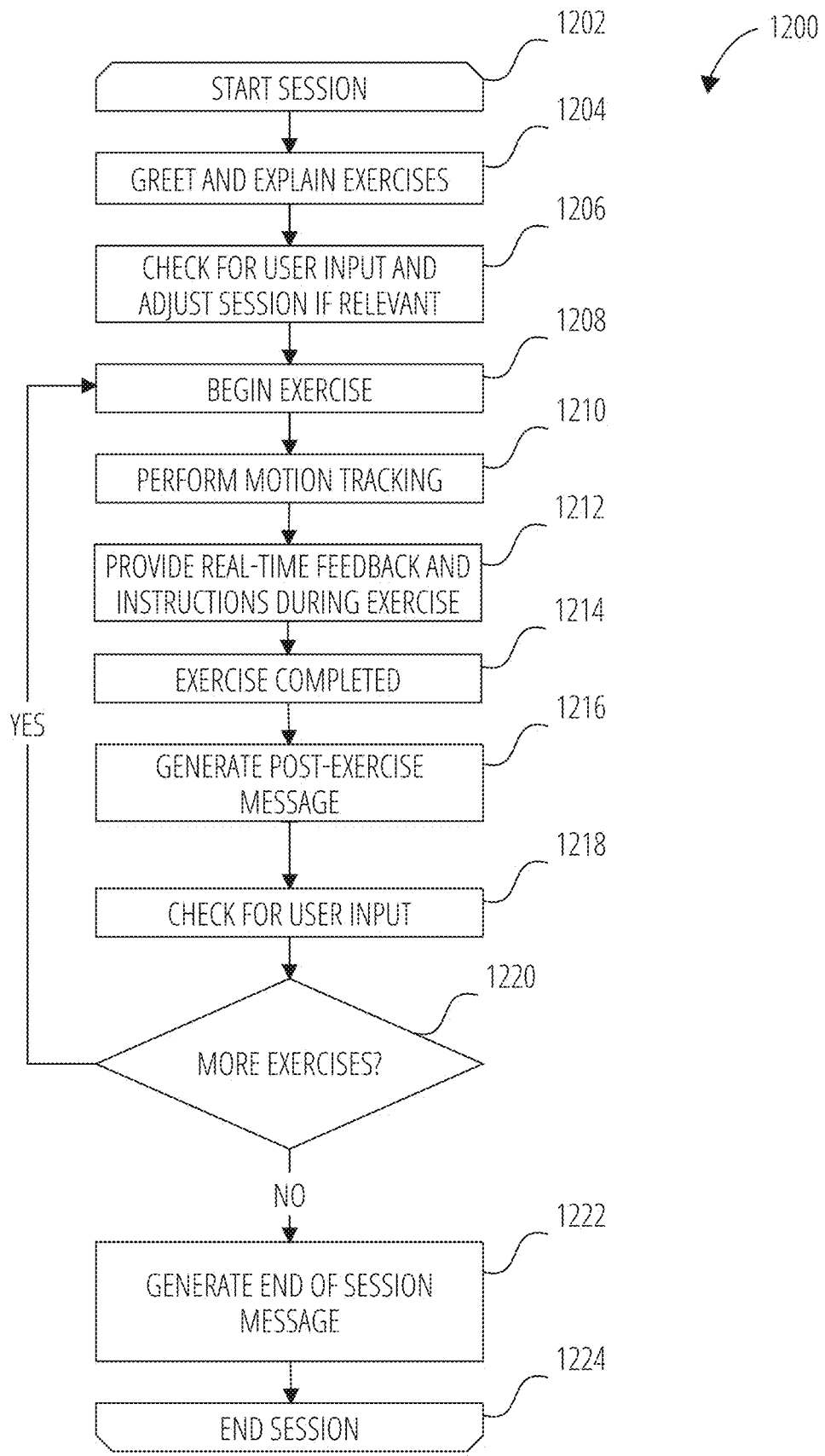
FIG. 12 is a flowchart illustrating a method of conducting an interactive digital therapy session, according to some examples.

FIG. 12 illustrates a method 1200 of conducting an interactive digital therapy session, according to some examples. The method 1200, as may be performed by the digital therapy platform 102 using components shown in FIG. 1 to FIG. 3 and/or using the portable computing device 400 or kit 500 shown in FIG. 4, FIG. 5, or FIG. 6, seeks to enhance the user's experience by providing timely and contextually relevant AI-generated messages that serve as touchpoints throughout a session. These messages may be delivered at various points in time, such as at the beginning of the session, after the completion of an exercise, during an exercise, and/or at the session's conclusion. Systems such as those described with reference to FIG. 2 can be employed for these purposes.

In some examples, at the onset of the session, the digital therapy platform 102 generates a welcoming message that is personalized to the user's profile, taking into account factors such as their progress in a therapy program, the date, or the specific time of day. This initial interaction may set a positive and encouraging tone, aiming to motivate the user and prepare them mentally for the session ahead.

The session may comprise performance of a plurality of exercises. Following each exercise, the digital therapy platform 102 may conduct an analysis of the user's performance using algorithms that assess a variety of metrics, such as range of motion, completion of repetitions, form, and/or the accuracy of movements. In some examples, based on this analysis, the digital therapy platform 102 crafts a postexercise message that provides personalized feedback. This feedback is informative, giving the user insight into their performance, and also, where relevant, motivational, highlighting their achievements and areas of improvement in a manner that encourages perseverance and dedication.

In some examples, the digital therapy platform 102 can also generate personalized messages while the user is performing a particular exercise. For example, the digital therapy platform 102 detects that the user is not performing an exercise correctly (e.g., their back is not straight) and provides real-time feedback to help the user correct the issue.

As the session draws to a close, the digital therapy platform 102 may synthesize data from the session to generate a concluding message. This message serves as a summary of the user's performance throughout the session, reinforcing positive behaviors and accomplishments while also setting goals and expectations for future sessions. In some examples, it is designed to leave the user with a sense of achievement and a clear understanding of their progress on their therapeutic journey.

In some examples, the digital therapy platform 102, through its intelligent use of AI messaging, creates a supportive environment that mirrors the interaction a user would have with a human therapist. By providing real-time, adaptive feedback, the system ensures that each session is a personalized and engaging experience, fostering an atmosphere conducive to recovery and rehabilitation. Such realtime, adaptive messaging or feedback can be facilitated by models such as LLMs, e.g., through the dynamic generation of prompts including relevant information to guide an LLM in generating an appropriate message.

Referring now specifically to the flowchart in FIG. 12, according to some examples, the method 1200 includes starting a session at opening loop element 1202. The digital therapy platform 102 initiates a new session when the user logs in, opts to start, or when a scheduled session time arrives. The user can use a computing device such as the portable computing device 400 of FIG. 4 for the session, e.g., to run the digital therapy application. The digital therapy platform 102 loads the user's profile (e.g., as part of the digital therapy application), including scheduled exercises and historical data from previous sessions.

At operation 1204, the digital therapy platform 102 engages in an initial user interaction and instructional phase of the session (e.g., through the engagement system 206). As the session commences, the digital therapy platform 102 activates a personalized communication protocol, generating a welcoming message that is tailored to the user's identity and current context. For example, this message is not merely a generic greeting; it is a thoughtful composition that incorporates the user's name, acknowledging their presence and participation. Additionally, the digital therapy platform 102 intelligently considers contextual factors such as the time of day for example offering a bright "Good morning" or a calming "Good evening" and the user's journey within the therapy program, recognizing milestones or encouraging continued progress.

Following the personalized greeting, the digital therapy platform 102 transitions to an educational mode, where it provides a detailed and understandable explanation of the exercises that are slated for the session. In some examples, this instructional content is designed to be clear and succinct, ensuring that the user comprehensively understands the activities they are about to undertake.

To cater to diverse learning preferences and accessibility needs, the digital therapy platform 102 employs a variety of instructional mediums. This can include audio output that is accompanied by appropriate visuals displayed at the user's device (e.g., on the display 402). Visual learners may benefit from illustrative aids such as diagrams or animated sequences that demonstrate the exercises, while auditory learners may prefer spoken instructions delivered through a text-to-speech conversion system of the digital therapy platform 102. For users 110 who favor reading or require written instructions to supplement their understanding, the digital therapy platform 102 can generate descriptive text. In some examples, the choice of instructional medium is determined by the user's pre-set preferences and the technological capabilities of the digital therapy platform 102.

In some examples, and as shown at operation 1206 of the method 1200, the digital therapy platform 102 checks for user input at this stage of the session. For example, the user may have provided new inputs, such as an indication of any new injury, their energy level, or what they are looking to achieve in the session. The digital therapy platform 102 can dynamically process such input and adjust the exercises accordingly (e.g., to accommodate an injury or energy level).

The method 1200 initiates the exercise regimen at operation 1208. This stage marks the transition from preparatory activities to the active engagement of the user in their prescribed exercises. As the user embarks on the first exercise, the digital therapy platform 102 serves as an interactive guide, providing real-time instructions to help the user perform movements with precision and care.

The digital therapy platform 102, equipped with monitoring capabilities such as those described elsewhere in the present disclosure, digitally captures data regarding the user's movements (and, in some cases, other data, such as vital signs). Utilizing computer vision technology, the digital therapy platform 102 captures a detailed account of the user's kinematics, providing a comprehensive analysis of each motion (e.g., using the observation system 202). Thus, the digital therapy platform 102 performs motion tracking at operation 1210. More details of motion tracking methodologies are described, for example, with reference to FIG. 7.

In some examples, as the user progresses through the exercise, the digital therapy platform 102 analyzes each movement for accuracy and consistency. Should the user deviate from the prescribed form, the digital therapy platform 102 may intervene. The digital therapy platform 102 may do so by offering corrective cues, which are designed to be intuitive and easily actionable, allowing the user to adjust their movements in real-time.

Specifically, in some examples, the method 1200 includes providing real-time, personalized cues during exercise at operation 1212 (e.g., via the engagement system 206). As the user performs the exercise, the digital therapy platform 102 analyzes the movement or other data in real-time. If deviations from the correct form are detected, the digital therapy platform 102 provides cues tailored to the user's immediate needs to correct their posture or movement. These personalized cues can facilitate an interactive conversation between the "AI care specialist," or "digital therapist," provided by the digital therapy platform 102 and the user, enhancing the adaptability of the session to the user's capabilities and responses.

For example, the AI care specialist might observe and comment, "You're struggling a bit with the upward part of the movement as you are losing your balance." If the user acknowledges the difficulty, responding with "Indeed, but I don't seem to be able to do it!" the AI care specialist can then offer actionable advice, such as, "Just focus on keeping your knees in place and rise slowly." The communication is designed to be actionable, providing the user with specific, real-time guidance that can be immediately implemented to improve performance. As mentioned, such communication can be implemented by dynamically prompting a model such as an LLM with relevant information (e.g., user and session context) and requesting a response in a particular format and style. Systems such as the data analysis system 204 and the engagement system 206 can work together to generate and deliver such messages.

Additionally, the digital therapy platform 102 may be equipped to handle requests from the user, such as asking the AI care specialist to skip an exercise due to pain. In such cases, the AI care specialist can respond with understanding and adapt the session accordingly, either by suggesting an alternative exercise or by providing reassurance and instructions for managing discomfort.

According to some examples, the method 1200 includes automatically determining that an exercise is completed at operation 1214. Once the user completes the exercise, the system processes the performance data to determine the quality of the exercise execution, such as the range of motion achieved and the accuracy of movements. This data may include the speed, acceleration, and trajectory of limbs, as well as the overall posture and alignment of the body during the exercise. Upon the completion of an exercise, the digital therapy platform 102 automatically detects this event using criteria such as the cessation of movement, the achievement of a target range of motion, or the completion of the expected number of repetitions.

According to some examples, the method 1200 includes generating a post-exercise message at operation 1216. For example, the digital therapy platform 102 may use performance data to generate a post-exercise message. This message includes personalized feedback on the user's performance, highlighting achievements such as improved range of motion or a high percentage of correct movements. The message may be crafted (e.g., using LLM prompting) to be motivational and encouraging, using positive reinforcement techniques.

In some examples, and as shown at operation 1218 of the method 1200, the digital therapy platform 102 checks for user input at this stage of the session. For example, the user may have provided the AI care specialist with an update on their energy level or pain level, or indicated a preference for the rest of the session. The digital therapy platform 102 can dynamically process such input and adjust the rest of the session accordingly.

At decision operation 1220, the digital therapy platform 102 determines whether the session includes further exercises scheduled for the session. If more exercises are planned, the digital therapy platform 102 proceeds to guide the user to the next exercise at operation 1208. If not, the digital therapy platform 102 transitions to the end-of-session phase.

Following a determination, at decision operation 1220, that no further exercises are scheduled for the session, the digital therapy platform 102 triggers ending of the session. At the culmination of the session, the digital therapy platform 102 engages in a process of data compilation and synthesis.

For example, the digital therapy platform 102 evaluates the user's performance, distilling the essence of their efforts, including the relevant motion tracking data, into a coherent end-of-session message which is generated at operation 1222. For example, the data analysis system 204 and the engagement system 206 work together to process the relevant data and generate the message. This message serves as an overview, providing the user with a clear picture of their performance, including progress made towards their goals. Moreover, the end-of-session message may include motivational elements, designed to motivate the user to persist with their therapy regimen. The message may highlight specific accomplishments, such as achieving a new personal best in range of motion or maintaining a consistent pattern of correct movements.

In some examples, the message also serves as a bridge to future sessions, providing the user with a sense of continuity and progression. This forward-looking perspective may help maintain the user's focus and motivation, ensuring that they remain engaged and committed to their long-term therapy goals.

According to some examples, the method 1200 includes ending the session at closing loop element 1224. The digital therapy platform 102 ends the session, logs the session data for future reference, and may schedule the next session based on the user's program or schedule. The user may then log out or be logged out (e.g., of the digital therapy application as described above), or the computing device shuts down.

Figure 13:
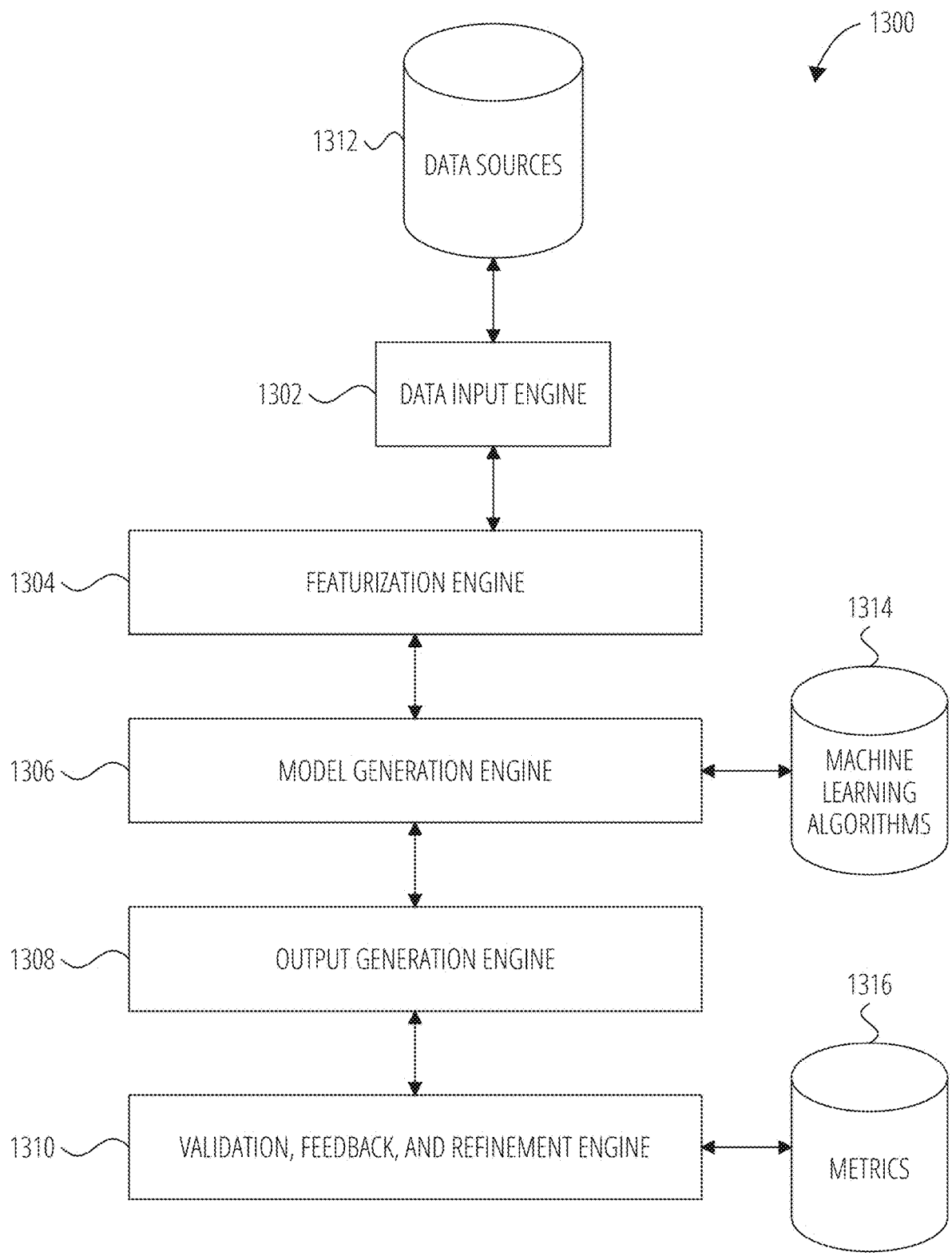
FIG. 13 is a block diagram illustrating components of a machine learning system, according to some examples.
Figure 14:
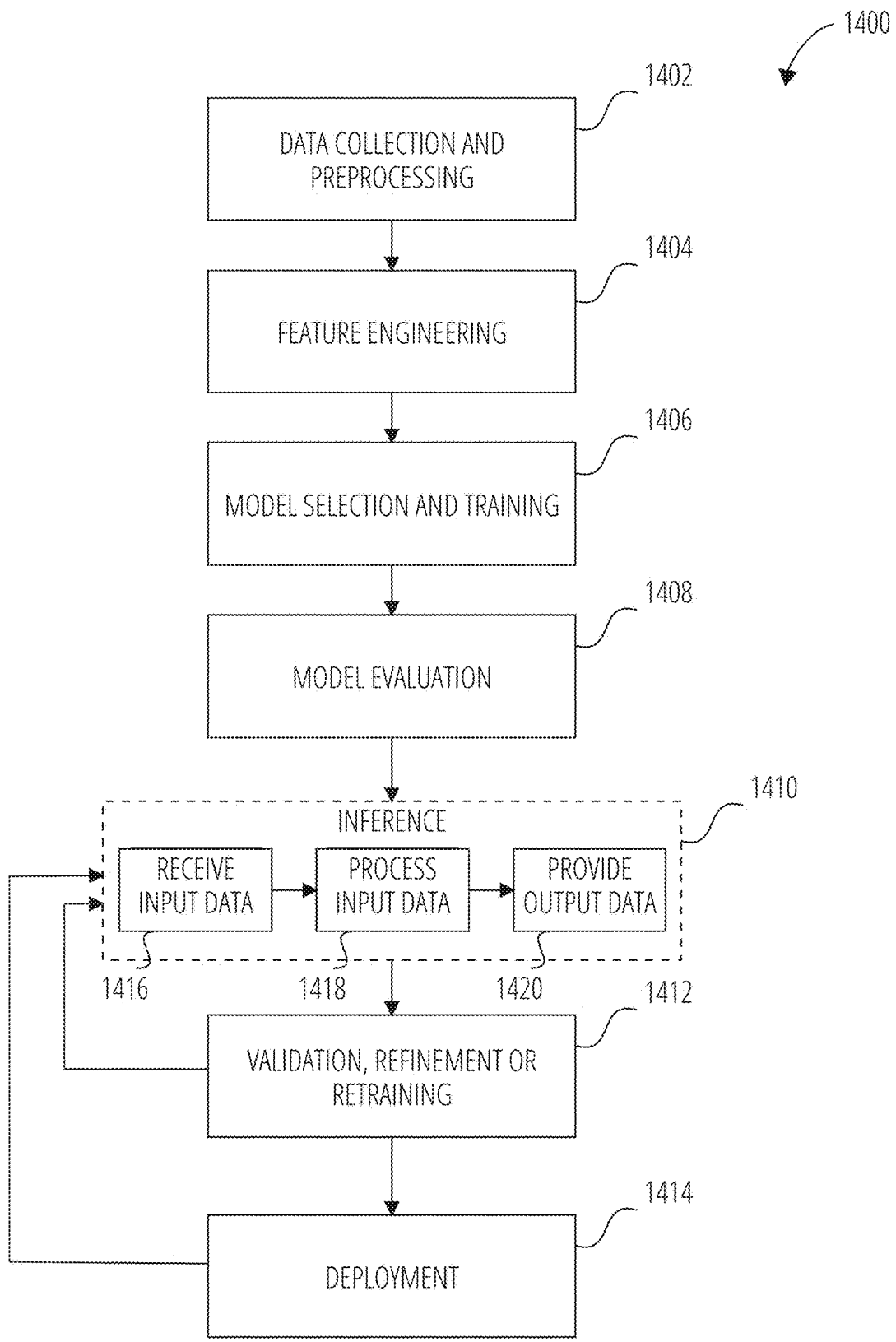
FIG. 14 is a flowchart illustrating a machine learning pipeline, according to some examples.
Figure 15:
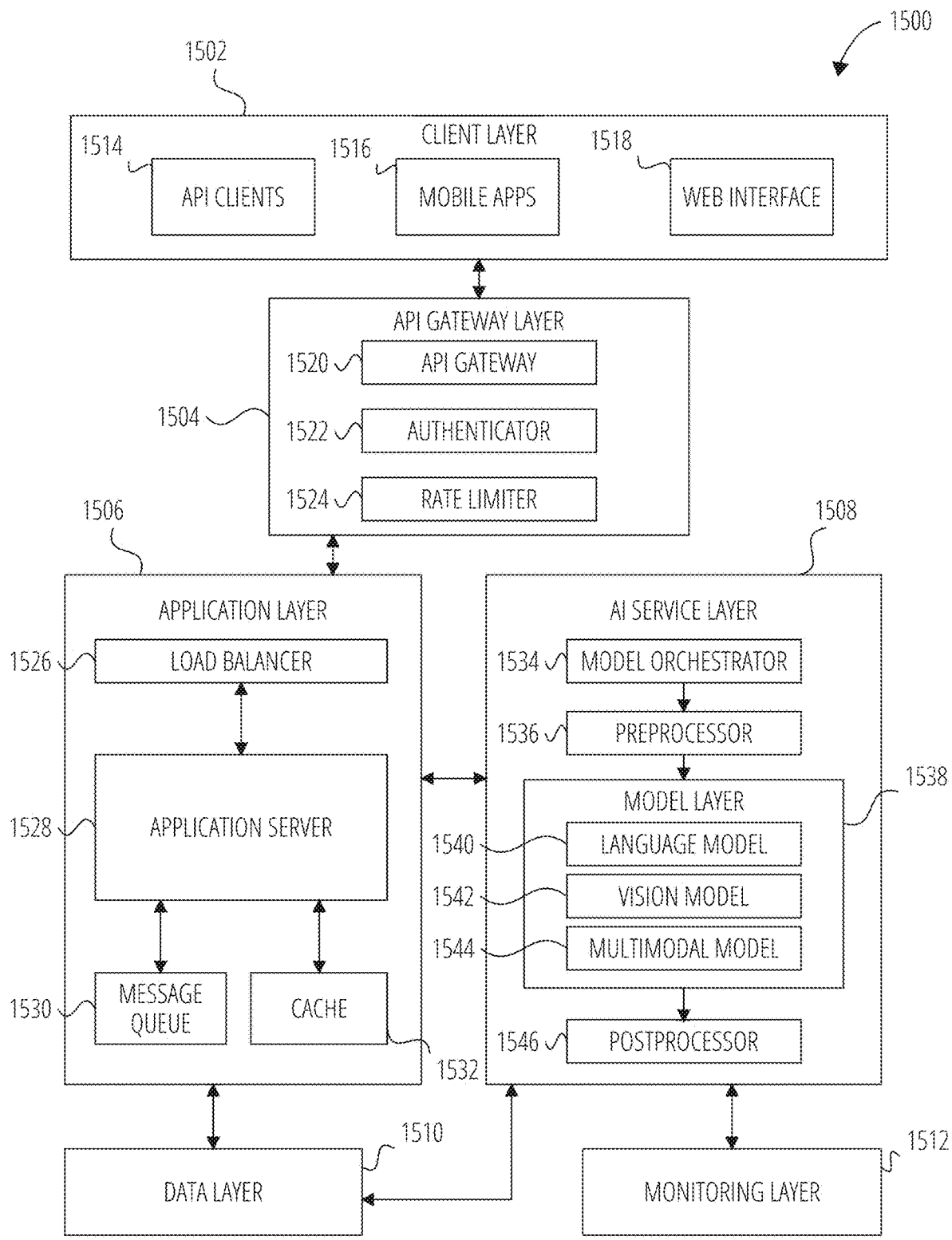
FIG. 15 is a system architecture diagram showing a layered view of an artificial intelligence (AI) integrated system, according to some examples.

Example AI Systems and Methodologies (FIG. 13 to FIG. 15)

FIG. 13 illustrates a machine learning system 1300, according to some examples. The machine learning system 1300 may be used to implement one or more aspects of the present disclosure. The machine learning system 1300 is shown to include a data input engine 1302, a featurization engine 1304, a model generation engine 1306, an output generation engine 1308, and a validation, feedback, and refinement engine 1310.

The data input engine 1302 may be configured to access, interpret, request, format, re-format, or receive input data from data sources 1312. Data sources 1312 may include training data (e.g., data for training machine learning models), validation data (e.g., data for comparing model output with known results to evaluate performance), or reference data (e.g., data used to establish baselines or inform model creation). The data input engine 1302 can interact with external data systems via input/output (I/O) devices, network interfaces, or storage elements to ensure input data is processed and stored in a suitable format for further operations.

The featurization engine 1304 may be configured to transform input data into features that that can be utilized by machine learning algorithms, which may include feature extraction, feature selection, normalization, encoding, and dimensionality reduction techniques. The featurization engine 1304 can handle feature extraction, scaling, or selection, helping the machine learning system 1300 to identify and process relevant data attributes for subsequent modeling. For example, features extracted from raw data may be annotated, labeled, or transformed into numerical representations suitable for machine learning algorithms 1314. The featurization engine 1304 can work iteratively with other components to refine features based on model requirements or outcomes.

The model generation engine 1306 is responsible for creating, training, and configuring one or more machine learning models based on input data and selected features. The model generation engine 1306 may include functionality for model selection, hyperparameter tuning, or algorithm implementation.

Machine learning broadly involves using computer algorithms to automatically learn patterns and/or relationships in data, often without the need for explicit programming. Thus, the machine learning algorithms 1314 may include various algorithms, including supervised, unsupervised, or reinforcement learning approaches, such as decision trees, neural networks, Support Vector Machines (SVMs), or deep learning architectures such as transformers or Convolutional Neural Networks (CNNs). The model generation engine 1306 may also support iterative model adjustment and validation cycles, which may allow for updates to the model based on new training data or changes in defined performance criteria as measured by, for example, metrics 1316.

In some examples, the output generation engine 1308 is responsible for model inference. The output generation engine 1308 processes data to produce predictions, classifications, or other results. The output generation engine 1308 can also apply post-processing techniques such as aggregation, thresholding, or confidence scoring to ensure outputs are in a format suitable for downstream systems or user interpretation.

The validation, feedback, and refinement engine 1310 may be configured to validate, monitor, or improve the performance and relevance of machine learning models over time. The validation, feedback, and refinement engine 1310 may apply validation data to compare model outputs against validation data, and may incorporate feedback from users or automated systems to potentially improve model performance based on specific metrics 1316. Metrics 1316 may be used to evaluate and compare model outputs against validation data or other useful data, providing insights into model performance, accuracy, reliability, or generalization. Refinement operations may involve retraining models with updated data or adjusting model parameters to account for changing conditions or newly observed patterns. Metrics 1316 may include performance evaluation measures such as accuracy, precision, recall, F1-score, area under the ROC curve (AUC), mean squared error (MSE), or log loss, depending on the type of machine learning task being performed.

Components of the machine learning system 1300 may be implemented by hardware processors and may communicate via network interfaces or shared storage elements to facilitate data exchange and coordination. The architecture shown in FIG. 13 provides a framework that may be configured for deployment in different machine learning applications, such as certain natural language processing tasks, computer vision implementations, or predictive analytics scenarios, with appropriate modifications to each component based on the particular application requirements.

FIG. 14 is a flowchart depicting a machine learning pipeline 1400, according to some examples. The machine learning pipeline 1400, or parts thereof, may be used to generate a trained machine learning model for use in one or more examples of the present disclosure.

The machine learning pipeline 1400 commences with a data collection and preprocessing stage 1402, in which data is acquired, cleaned, or formatted for compatibility with machine learning algorithms. The data collection and preprocessing stage 1402 may also involve addressing issues such as duplicate entries, missing values, or data inconsistencies.

During a feature engineering stage 1404, training data can be formatted, transformed, or selected as needed to create features that are useful for predicting target data. Feature engineering may include (1) receiving features (e.g., as structured or labeled data in supervised learning) and/or (2) identifying features (e.g., unstructured or unlabeled data for unsupervised learning) in training data. In this context, a feature may be a variable or attribute, such as a measurable property of a process, article, system, or phenomenon represented by a data set. Features may also be of different types, such as numeric features, strings, and graphs, and may include one or more of content, concepts, attributes, historical data, or user data, merely for example. During feature engineering stage 1404, raw data may be transformed into representative features through techniques such as normalization, one-hot encoding, binning, embedding generation, or feature crossing, which can improve model performance and generalization capabilities.

A model selection and training stage 1406 can include selecting an appropriate machine learning algorithm or strategy and training the relevant model on training data. The model selection and training stage 1406 may involve splitting the data into training and testing sets, using cross-validation to evaluate the model, and tuning hyperparameters to improve performance. During training, the model may be trained to find features that affect a predicted outcome. The result of the training is a trained machine learning model.

During training, the model may learn to optimize parameters through techniques such as gradient descent, stochastic gradient descent (SGD), or adaptive optimization methods like Adam or RMSprop, which can help minimize the loss function and improve model convergence. In some examples, techniques such as model quantization, pruning, or knowledge distillation can reduce the computational complexity of a trained model. Quantization involves reducing the precision of weights and activations (e.g., from 32-bit floating-point to 8-bit integers), which may help with efficient deployment on hardware-constrained environments such as edge devices. Pruning removes redundant or non-contributory connections within a model, thereby reducing memory and processing requirements. Knowledge distillation transfers the learned knowledge of a large, complex model into a smaller, lightweight model.

A model evaluation stage 1408 may include evaluating the performance of a trained model on a separate testing dataset. This can help determine if the model is overfitting or underfitting and determine whether the model is suitable for deployment. Regularization techniques, such as dropout or L2 regularization, may also be employed to help reduce overfitting and improve generalization.

FIG. 14 further shows an inference stage 1410, in which a trained model generates outputs on new, unseen data. For example, for each input, at operation 1416, the model receives input data (e.g., from external sources, such as real-time sensors, databases, or user-provided queries, or internal sources such as test inputs). At operation 1418, the trained model processes the input data. This can include various operations that are performed to arrive at output data, such as feature extraction, transformation, and embedding generation, depending on the model architecture. For example, a CNN may process input images by applying convolutional filters, while a transformer model might encode textual input using self-attention mechanisms. The trained model may perform inference, mapping inputs to outputs, such as predictions or classifications, thereby providing the output data at operation 1420.

It is noted that output data may take various forms. In classification AI examples, outputs may include data classifications or probabilities linked to particular classifications. In generative AI examples, outputs may include new content, such as translations, summaries, answers, new media content, or combinations thereof. In some examples, outputs are further processed into usable output, such as probabilities, labels, or continuous values tailored for downstream systems. Post-processing may include confidence scoring, aggregation, or error correction, to ensure outputs are accurate and actionable for the intended application.

The machine learning pipeline 1400 may also include a validation, refinement, or retraining stage 1412. This may include updating a model based on feedback generated from the inference stage 1410, such as new data or user feedback. In some examples, validation is performed using a separate dataset known as the validation dataset. The validation dataset can be used to tune or fine-tune the hyperparameters of a model, such as the learning rate and the regularization parameter. The hyperparameters may be adjusted to improve the model's performance on the validation dataset.

During deployment stage 1414, the trained model is integrated into or connected with a more extensive or real-world system, application, or environment, such as a web service, mobile app, or Internet of Things (IoT) device. This phase can involve setting up APIs, building a user interface, and ensuring that the model is scalable and can handle large volumes of data. In some examples, the trained model is deployed on a single device, such as locally on an end user's computing device or on an edge device, as opposed to being deployed on a server system. This may provide lower latency or offline functionality in certain scenarios. Accordingly, various trained models can be deployed as server-based deployments or on-device deployments.

In some examples, a trained model includes one or more neural networks. The neural network may include a hierarchical (e.g., layered) organization of neurons or nodes, with each layer consisting of multiple neurons or nodes. Neurons in the input layer receive the input data, while neurons in the output layer produce the final output of the network. Between the input and output layers, there may be one or more hidden layers, each consisting of multiple neurons.

Each neuron may operationally compute a function, such as an activation function, which takes as input the weighted sum of the outputs of the neurons in the previous layer, as well as a bias term. The output of this function is then passed as input to the neurons in the next layer. If the output of the activation function exceeds a certain threshold, an output is communicated from that neuron (e.g., transmitting neuron) to a connected neuron (e.g., receiving neuron) in successive layers. The connections between neurons have associated weights, which define the influence of the input from a transmitting neuron to a receiving neuron. During the training phase, these weights are adjusted by the learning algorithm to optimize the performance of the network. Different types of neural networks may use different activation functions and learning algorithms, affecting their performance on different tasks. The layered organization of neurons and the use of activation functions and weights help neural networks to model complex relationships between inputs and outputs, and to generalize to new inputs that were not seen during training.

A neural network can be applied in various scenarios. In some cases, the neural network is configured to perform an image or video processing task. For example, the task may be image classification. As another example, the task can be image embedding generation and the output generated by the neural network can be a numeric embedding of the input image. As yet another example, the task can be object detection and the output generated by the neural network can identify locations in the input image at which particular types of objects are depicted. As another example, if the input to the neural network is a sequence of text in one language, the output generated by the neural network may be a piece of text in the other language that is a predicted proper translation of the input text into the other language.

In some cases, a machine learning task is a multi-modal processing task that requires processing multi-modal data. In general, multi-modal data is a combination of two or more different types of data, e.g., two or more of audio data, image data, text data, or graph data. As one example, the multi-modal data may comprise audio-visual data, comprising a combination of pixels of an image or of video and audio data representing values of a digitized audio waveform. As another example, the multi-modal data may comprise a combination of text data representing text in a natural language and pixels of an image.

In some examples, the neural network may also be one of several different types of neural networks, such as a single-layer feed-forward network, a Multilayer Perceptron (MLP), an Artificial Neural Network (ANN), a Recurrent Neural Network (RNN), a Long Short-Term Memory Network (LSTM), a Bidirectional Neural Network, a symmetrically connected neural network, a Deep Belief Network (DBN), a CNN, a Generative Adversarial Network (GAN), an Autoencoder Neural Network (AE), a Restricted Boltzmann Machine (RBM), a Hopfield Network, a Self-Organizing Map (SOM), a Radial Basis Function Network (RBFN), a Spiking Neural Network (SNN), a Liquid State Machine (LSM), an Echo State Network (ESN), a Neural Turing Machine (NTM), or a Transformer Network, merely for example.

As mentioned, a generative AI model can generate new content. For example, generative AI can produce text, images, video, audio, code, or synthetic data. In some examples, the generated content may be similar to original data, but not identical.

Some of the techniques or architectures that may be used in generative AI are GANs, Variational autoencoders (VAEs), and transformers. GANs may include two neural networks: a generator and a discriminator. The generator network attempts to create realistic content that can "fool" the discriminator network, while the discriminator network attempts to distinguish between real and fake content. The generator and discriminator networks operate in an adversarial relationship where, through iterative training, the generator may produce increasingly realistic outputs while the discriminator may become more effective at distinguishing between real and generated content. VAEs may encode input data into a latent space (e.g., a compressed representation) and then decode it back into output data. The latent space can be manipulated to generate new variations of the output data. VAEs may use self-attention mechanisms to process input data, allowing them to handle long text sequences and capture complex dependencies. Transformer models may use attention mechanisms to learn the relationships between different parts of input data (such as words or pixels) and generate output data based on these relationships. In some examples, transformer models can handle sequential data, such as text or speech, as well as non-sequential data, such as images or code.

Examples: Machine Learning Model Specification, Training, and Configuration

Various machine learning models can be used for computer vision techniques. Pose estimation or pose tracking models may be designed to receive images as inputs, such as in RGB or BGR colorspace. Images can be raw (e.g., 0-255 range) or normalized. Such models may be trained to return coordinates for each keypoint of a set of keypoints (e.g., 2D or 3D). The model may also return a score indicating the confidence in a prediction. In some examples, the model returns a heatmap for each key point which indicates the probability distribution of their positions. In some examples, the model outputs further data such as one or more of a visibility score for each key point, an overall confidence score for the entire pose, a segmentation mask, or a heatmap for joints around which landmarks have higher probabilities of being located.

In some examples, the machine learning model is in the form of a computer vision model for human pose tracking to allow a digital therapy platform to assess how a user is performing certain exercises. The architecture of this machine learning model includes, for example, a lightweight convolutional neural network (CNN) topology. For instance, a neural network may include 34 layers with ReLU activation functions and convolutional connections, designed for efficiency and real-time performance on resource-constrained devices.

The example machine learning model is trained using supervised learning. The training process employs gradient descent with backpropagation, with a focus on minimizing a loss function such as mean squared error to optimize keypoint localization accuracy. The model parameters are adjusted iteratively based on a training strategy involving a batch size of 32 and an exponentially decaying learning rate schedule.

In some examples, the training data used for the machine learning model is sourced from publicly available datasets, such as COCO and MPII Human Pose, supplemented with proprietary motion capture data. The training data may include representative variations of the relevant parameters, such as joint angles, body orientations, and lighting conditions. For instance, the training dataset is structured to cover diverse human poses and movements and includes 100,000 or more examples.

Input data to the machine learning model may include RGB video frames or image sequences captured from a camera. In some examples, these inputs are preprocessed using normalization and resizing to a fixed resolution (e.g., 256×256 pixels). For example, pixel intensities are normalized to a range of [0, 1] using min-max normalization to ensure consistent input scaling. In some examples, input may also include depth information, such as depth map data.

The output of the machine learning model represents 2D or 3D coordinates of human keypoints (e.g., joints like shoulders, elbows, and knees). In some examples, the machine learning model generates outputs such as predicted joint positions in a format compatible with downstream processes, using postprocessing methods like heatmap decoding and coordinate regression to refine predictions.

The example machine learning model uses specific parameters for its computations, including a learning rate, momentum, and weight decay coefficients. These parameters can be chosen based on hyperparameter optimization using grid search or random search. For example, the learning rate is set to 0.001 to balance convergence speed and stability. To ensure the effectiveness of the machine learning model, input parameters are selected based on their relevance to the predicted output. For instance, pixel intensities and spatial relationships have been identified as parameters influencing joint position accuracy. Parameters that are less relevant, such as background textures, may be omitted or weighted lower during training.

In some examples, training data undergoes validation to ensure quality and representativeness. This can include checks for missing values, mislabeled keypoints, or inconsistent annotations. For example, outlier detection is performed using interquartile range (IQR) analysis, and invalid data points are either corrected or excluded. In some examples, an Object Keypoint Similarly (OKS) metric is applied to validate the accuracy of a pose estimation model. The OKS metric estimates a similarity measure between two sets of keypoints and may be used to compare landmark estimations with image labels.

The machine learning model may be adapted periodically using new data from real-time user interactions on the digital therapy platform. Adaptation may involve fine-tuning pre-trained weights to account for evolving user demographics or newly observed exercise patterns.

The machine learning model is designed with energy efficiency in mind, employing techniques such as model pruning and quantization to reduce computational demands. For instance, pruning may remove redundant filters in convolutional layers without significant loss of accuracy, while quantization lowers precision requirements to 8-bit integers to reduce energy consumption during inference. The model can also leverage energy-efficient hardware, such as edge processors or mobile GPUs, to optimize resource usage. Training and inference pipelines are structured to minimize redundant computations by employing caching intermediate results. Energy consumption metrics, such as power usage effectiveness (PUE), are monitored during development to ensure alignment with sustainability goals.

The machine learning model can be deployed in various environments, including edge devices such as tablet computer or smartphones that can be used in digital therapy. Deployment considerations include optimizing for latency and memory usage, ensuring compatibility with mobile operating systems (e.g., iOS or Android), and adhering to low-latency requirements for real-time feedback. For instance, the model may be containerized using Docker for scalability and portability across different systems.

FIG. 15 is a system architecture diagram showing a layered view of an AI integrated system 1500, according to some examples. The AI integrated system 1500 comprises six example layers: a client layer 1502, an API gateway layer 1504, an application layer 1506, an AI service layer 1508, a data layer 1510, and a monitoring layer 1512.

The client layer 1502 provides multiple access points for system interaction. It includes API clients 1514, which may facilitate programmatic access to the capabilities of the AI integrated system 1500 or integration with third-party systems and services. Mobile applications 1516 facilitate access from mobile applications and devices, for example implementing native mobile protocols while maintaining consistent communication patterns with backend systems. A web interface 1518 enables browser-based access to the capabilities of the AI integrated system 1500 and may communicate with other layers using, for example, Hypertext Transfer Protocol (HTTP) or Hypertext Transfer Protocol Secure (HTTPS) protocols.

The API gateway layer 1504 serves as an entry point for client communications. The API gateway layer 1504 comprises an API gateway 1520, which may implement routing logic to direct incoming requests to appropriate backend services. An authenticator 1522 validates client credentials, for example using industry-standard protocols, such as OAuth 2.0 (Open Authorization 2.0) or JWT (JSON Web Tokens). In some examples, a rate limiter 1524 of the API gateway layer 1504 operates to help reduce system abuse or ensure resource allocation among clients.

The application layer 1506 comprises various processing capabilities. In some examples, the application layer 1506 includes a load balancer 1526 that may distribute incoming requests across multiple application server instances to support resource utilization and system reliability. An application server 1528 may implement business or core functional logic of the AI integrated system 1500, processing requests and coordinating responses across various system components. In some examples, a message queue 1530 facilitates asynchronous processing capabilities, facilitating efficient handling of operations, and a cache 1532 operates within the application layer 1506 to improve response times for frequently requested data.

The AI service layer 1508 provides AI capabilities through a structured approach to model deployment and execution. In some examples, the AI service layer 1508 includes a model orchestrator 1534 that coordinates the execution of one or various AI models, managing resource allocation and implementing routing logic to direct requests to appropriate model instances. The model orchestrator 1534 may implement functionality such as container orchestration, model versioning, and dynamic scaling to efficiently manage model deployment and execution across computing resources. A preprocessor 1536 may prepare input data for model consumption, implementing transformations, validations, or other preprocessing operations.

FIG. 15 shows the AI service layer 1508 as including a model layer 1538. The model layer 1538 may include multiple model types, including, for example, one or more of: a language model 1540 for processing textual input, implementing natural language processing capabilities; a vision model 1542 for handling image or video processing tasks; and a multimodal model 1544 that combines multiple input types to provide comprehensive analysis capabilities. In some examples, a postprocessor 1546 of the AI service layer 1508 transforms model outputs into standardized formats suitable for client consumption.

The data layer 1510 provides persistent storage capabilities. While not detailed in FIG. 15, it is noted that the data layer 1510 may include various components such as a primary database for maintaining transactional data, a vector database for optimizing storage and retrieval of high-dimensional vectors used in AI applications and models of the AI service layer 1508, or a file storage component for managing binary data assets.

The monitoring layer 1512 may provide observability capabilities across the AI integrated system 1500. This may include logging for capturing system events, metrics collection for performance analysis, or distributed tracing for detailed analysis of request flow through the system.

Communication between layers of the AI integrated system 1500 may follow defined patterns. External communications may implement appropriate encryption protocols, for example utilizing Transport Layer Security (TLS) or Secure Sockets Layer (SSL) for data protection. Internal communications may use various protocols selected for specific use cases, for example, Hypertext Transfer Protocol version 2 (HTTP/2), gRPC (Google Remote Procedure Call), or proprietary protocols where appropriate.

Referring again to the model layer 1538, this layer may incorporate various types of machine learning models. Neural networks may be deployed to implement various architectures suited to specific processing needs.

A language model such as the language model 1540 may use transformer-based architectures (e.g., Bidirectional Encoder Representations from Transformers (BERT), Generative Pre-trained Transformer (GPT) variants, or Text-to-Text Transfer Transformer (T5)) for processing textual data and implementing natural language understanding capabilities. A vision model such as the vision model 1542 may employ specialized neural network architectures (e.g., CNNs, Vision Transformers (ViT), or Residual Neural Network (ResNet) variants) for processing visual information and extracting features from images or video streams. A multimodal model such as the multimodal model 1544 may implement hybrid architectures (e.g., Contrastive Language-Image Pre-training (CLIP), DALL-E variants, or multimodal transformers) designed to process and correlate information across different input modalities, leveraging ensemble approaches to combine multiple model types using model aggregation or weighted prediction strategies. A multimodal model may combine textual, visual, and other forms of input data to provide analysis and generate integrated outputs that leverage cross-modal understanding capabilities.

The AI service layer 1508 may provide both supervised learning models (e.g., decision trees, random forests, or support vector machines) for specific classification and prediction tasks, and unsupervised learning models (e.g., k-means clustering or principal component analysis) for pattern discovery and dimensionality reduction within the data processing pipeline. Probabilistic models (e.g., Bayesian networks or hidden Markov models) may be integrated within the AI service layer 1508 to handle uncertainty in decision-making processes, working in conjunction with the preprocessor 1536 and postprocessor 1546 components to provide probability estimates and confidence metrics for model outputs.

Each model type may be implemented using various deployment strategies, with the model orchestrator 1534 managing their execution and resource allocation to ensure adequate performance and efficient system operation. This may include coordinating the deployment and execution of various model types, ensuring efficient resource allocation, and appropriate model selection based on specific task requirements. While in some examples the model layer 1538 provides server-based access to one or more models, a model can alternatively (or additionally) be deployed so as to perform inference locally (e.g., at the client layer 1502).

Figure 16:
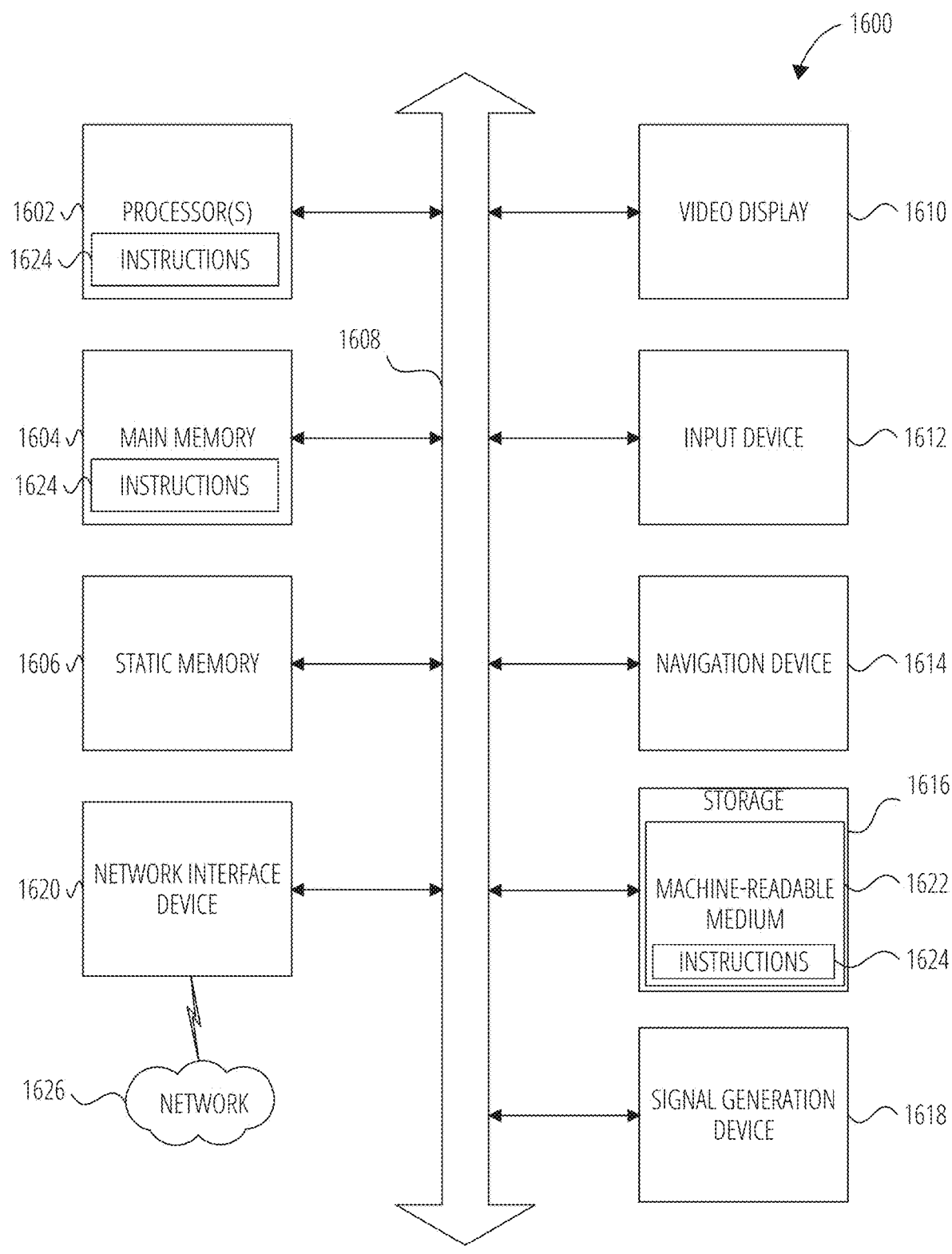
FIG. 16 is a block diagram of a computing system, according to some examples, within which instructions may be executed to perform one or more of the methodologies discussed herein.

Example Computing Systems (FIG. 16)

FIG. 16 is a block diagram of a machine in the example form of a computing system 1600, according to some examples, within which instructions 1624 may be executed for causing the computing system 1600 to perform one or more of the methodologies discussed herein. In some examples, the computing system 1600 includes a machine that operates as a standalone device, while in other examples the computing system 1600 includes a machine that is connected (e.g., networked) to other machines. The computing system 1600 can provide or form part of an operating environment in which aspects of the present disclosure are implemented.

In a networked deployment, a machine may operate in the capacity of a server or a client machine in server-client network environment, or as a peer machine in a peer-to-peer (or distributed) network environment. The machine may be a computer, a tablet, a cellular telephone, a web appliance, or other machine capable of executing instructions (sequential or otherwise) that specify actions to be taken by that machine. It is noted that while components typically related to only a single machine are illustrated in FIG. 16, the term "machine" shall also be taken to include any collection of machines that individually or jointly execute a set (or multiple sets) of instructions to perform any one or more of the methodologies discussed herein. The computing system 1600 may thus include multiple connected machines. Computing devices can be connected by a network.

The example computing system 1600 includes one or more processor(s) 1602 (e.g., a Central Processing Unit (CPU), a Graphics Processing Unit (GPU), or both), a primary or main memory 1604, and a static memory 1606, which communicate with each other via one or more communication connections 1608 (e.g., a bus, controller, or network connection). The computing system 1600 may further include one or more output devices, such as a display unit 1610 (e.g., an LCD or Light-emitting diode (LED) display).

The computing system 1600 also includes one or more input devices, such as an input device 1612 (e.g., a keyboard or a touch-sensitive display screen), a navigation device 1614 (e.g., a mouse), storage 1616, a signal generation device 1618 (e.g., a speaker), and a network interface device 1620. The storage 1616 includes a machine-readable medium 1622 on which is stored one or more sets of data structures and instructions 1624 (e.g., software) embodying or utilized by one or more of the methodologies or functions described herein. The instructions 1624 may also reside, completely or at least partially, within the main memory 1604 or within the processor(s) 1602 during execution thereof by the computing system 1600, with the main memory 1604 and the processor(s) 1602 also each constituting a machine-readable medium 1622.

While the machine-readable medium 1622 is shown in accordance with some examples to be a single medium, the term "machine-readable medium" may include a single medium or multiple media (e.g., a centralized or distributed database, or associated caches and servers) that store the one or more instructions 1624 or data structures. The term "machine-readable medium" shall also be taken to include any tangible medium that is capable of storing, encoding, or carrying instructions 1624 for execution by the machine and that cause the machine to perform any one or more of the methodologies of the present disclosure, or that is capable of storing, encoding, or carrying data structures utilized by or associated with such instructions 1624. The term "machine-readable medium" shall accordingly be taken to include, but not be limited to, solid-state memories, and optical and magnetic media. Specific examples of a machine-readable medium 1622 include non-volatile memory, including by way of example semiconductor memory devices, e.g., erasable programmable read-only memory (EPROM), electrically erasable programmable read-only memory (EEPROM), and flash memory devices; magnetic disks such as internal hard disks and removable disks; magneto-optical disks; and compact disc read-only memory (CD-ROM) and digital versatile disc read-only memory (DVD-ROM) disks. A machine-readable medium is not a transmission medium.

The instructions 1624 may further be transmitted or received over a communications network 1626 using a transmission medium. The instructions 1624 may be transmitted using the network interface device 1620 and any one of a number of well-known transfer protocols (e.g., hypertext transport protocol (HTTP)). Examples of communication networks include a local area network (LAN), a wide area network (WAN), the Internet, mobile telephone networks, plain old telephone (POTS) networks, and wireless data networks (e.g., Wi-Fi and Wi-Max networks). The term "transmission medium" shall be taken to include any intangible medium that is capable of storing, encoding, or carrying instructions 1624 for execution by the machine, and includes digital or analog communications signals or other intangible media to facilitate communication of such software.

Typically, operating system software (not shown) provides an operating environment for software executing in the computing system 1600, and coordinates activities of the components of the computing system 1600. One or more API calls may be made between components of the computing system 1600, or between a component of the computing system 1600 and an external component, based on user input received at the computing system 1600.

CONCLUSION

As used herein, the term "processor" may refer to any one or more circuits or virtual circuits (e.g., a physical circuit emulated by logic executing on an actual processor) that manipulates data values according to control signals (e.g., commands, opcodes, machine code, control words, macro-instructions, etc.) and which produces corresponding output signals that are applied to operate a machine. A processor may, for example, include at least one of a CPU, a Reduced Instruction Set Computing (RISC) Processor, a Complex Instruction Set Computing (CISC) Processor, a GPU, a Digital Signal Processor (DSP), a Tensor Processing Unit (TPU), a Neural Processing Unit (NPU), a Vision Processing Unit (VPU), a Machine Learning Accelerator, an Artificial Intelligence Accelerator, an Application Specific Integrated Circuit (ASIC), a Field Programmable Gate Array (FPGA), a Radio-Frequency Integrated Circuit (RFIC), a Neuromorphic Processor, a Quantum Processor, or any combination thereof. A processor may be a multi-core processor having two or more independent processors (sometimes referred to as "cores") that may execute instructions contemporaneously. Multi-core processors may contain multiple computational cores on a single integrated circuit die, each of which can independently execute program instructions in parallel. Parallel processing on multi-core processors may be implemented via architectures like superscalar, VLIW, vector processing, or SIMD that allow each core to run separate instruction streams concurrently. A processor may be emulated in software, running on a physical processor, as a virtual processor or virtual circuit. The virtual processor may behave like an independent processor but is implemented in software rather than hardware.

Operations of example methods described herein may be performed, at least partially, by one or more processors that are temporarily configured (e.g., by software) or permanently configured to perform the relevant operations. The performance of certain of the operations may be distributed among the one or more processors, not only residing within a single machine, but deployed across a number of machines. A hardware-implemented component for performing method operations may comprise dedicated circuitry or logic that is permanently configured (e.g., as a special-purpose processor, such as an FPGA or an ASIC) to perform certain operations. A hardware-implemented component may also comprise programmable logic or circuitry (e.g., as encompassed within a general-purpose processor or another programmable processor) that is temporarily configured by software to perform certain operations.

One or more processors may operate to support performance of the relevant operations in a "cloud computing" environment or as a "software as a service (SaaS)." For example, at least some of the operations may be performed by a group of computers (as examples of machines including processors), these operations being accessible via a network (e.g., the Internet) and via one or more appropriate interfaces (e.g., APIs). In practice, cloud-based, on-premises-based, or hybrid scenarios can be supported in some examples.

Examples may be implemented in digital electronic circuitry, or in computer hardware, firmware, or software, or in combinations of them. Examples may be implemented using a computer program product, such as a computer program tangibly embodied in an information carrier (e.g., in a machine-readable medium for execution by, or to control the operation of, data processing apparatus, such as a programmable processor, a computer, or multiple computers). A computer program can be written in any suitable form of programming language, including compiled or interpreted languages, and it can be deployed in any form, including as a standalone program or as a module, subroutine, or other unit suitable for use in a computing environment. A computer program can be deployed to be executed on one computer or on multiple computers at one site or distributed across multiple sites and interconnected by a communication network.

Although specific examples are described herein, it will be evident that various modifications and changes may be made to these examples without departing from the broader spirit and scope of the disclosure. Accordingly, the specification and drawings are to be regarded in an illustrative rather than a restrictive sense. Examples of the subject matter may be referred to herein, individually or collectively, by the term "example" merely for convenience and without intending to voluntarily limit the scope of this application to any single example or concept if more than one is in fact disclosed. Thus, although specific examples have been illustrated and described herein, it should be appreciated that the present disclosure can also cover adaptations, combinations, or variations of various examples, including structural or logical substitutions and changes.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or any suitable combination thereof), registers, or other machine components that receive, store, transmit, or display information. Furthermore, unless specifically stated otherwise, the terms "a" and "an" are herein used, as is common in patent documents, to include one or more than one instance. Where the context permits, words using the singular or plural number may also include the plural or singular number, respectively. Except as otherwise indicated, the word "or" in reference to a list of two or more items, covers all of the following interpretations of the word: any one of the items in the list, all of the items in the list, and any combination of the items in the list.

As used in this disclosure, phrases of the form "at least one of an A, a B, or a C," "at least one of A, B, or C," "at least one of A, B, and C," and the like, should be interpreted to select at least one from the group that comprises "A, B, and C." Unless explicitly stated otherwise in connection with a particular instance in this disclosure, this manner of phrasing does not mean "at least one of A, at least one of B, and at least one of C." As used in this disclosure, the example "at least one of an A, a B, or a C," would cover any of the following selections: {A}, {B}, {C}, {A, B}, {A, C}, {B, C}, and {A, B, C}.

Although some examples, such as those depicted in the drawings, include a particular sequence of operations, the sequence may be altered without departing from the scope of the present disclosure. For example, some of the operations depicted may be performed in parallel or in a different sequence that does not materially affect the functions as described in the examples. In other examples, different components of an example device or system that implements an example method may perform functions at substantially the same time or in a specific sequence. The term "operation" is used to refer to elements in the drawings of this disclosure for ease of reference and it will be appreciated that each "operation" may identify one or more operations, processes, actions, or steps, and may be performed by one or multiple components.

EXAMPLES

In view of the above-described implementations of subject matter this application discloses the following list of examples, wherein one feature of an example in isolation or more than one feature of an example, taken in combination and, optionally, in combination with one or more features of one or more further examples are further examples also falling within the disclosure of this application.

Example 1 is one or more non-transitory machine-readable storage media including instructions that, when executed by one or more processors, cause the one or more processors to perform operations comprising: accessing images of a full body of a user captured by a first image sensor and a second image sensor of a portable computing device, the images captured while the portable computing device is positioned in a substantially vertical orientation and while the user is performing one or more exercises; processing the images to: generate HDR image data, and determine depth information associated with the user; and generating, in real time and while the user is performing the one or more exercises, motion tracking data based on the HDR image data and the depth information.

In Example 2, the subject matter of Example 1 includes, wherein the first image sensor and the second image sensor simultaneously capture pairs of images at different exposure levels, and the HDR image data is generated for each pair of images by a process comprising: aligning a first image from the first image sensor and a second image from the second image sensor to obtain aligned image data; and generating a final image using the aligned image data.

In Example 3, the subject matter of Example 2 includes, wherein generating the final image comprises performing at least one of exposure fusion or tone mapping.

In Example 4, the subject matter of any of Examples 2-3 includes, wherein at least one of aligning the first image with the second image or generating the final image comprises executing one or more machine learning models.

In Example 5, the subject matter of any of Examples 1-4 includes, wherein determining the depth information comprises generating a depth map to estimate a distance between one or more body parts of the user and the portable computing device.

In Example 6, the subject matter of any of Examples 1-5 includes, performing stereoscopic correction using a first image from the first image sensor and a second image from the second image sensor.

In Example 7, the subject matter of any of Examples 1-6 includes, wherein determining the depth information comprises executing one or more machine learning models.

In Example 8, the subject matter of any of Examples 1-7 includes, wherein generating the motion tracking data comprises processing the HDR image data and the depth information to analyze body landmarks of the user while the user performs the one or more exercises (e.g., performing pose estimation).

In Example 9, the subject matter of Example 8 includes, wherein processing the HDR image data and the depth information to comprises: generating pose estimation data based on the HDR image data; and adjusting the pose estimation data using the depth information.

In Example 10, the subject matter of any of Examples 1-9 includes, wherein the images comprise a plurality of images captured over time at a fixed, substantially vertical axis.

In Example 11, the subject matter of any of Examples 1-10 includes, wherein the one or more exercises comprise at least two of: a first exercise performed in a substantially upright position in front of the portable computing device, a second exercise performed in a supported position in front of the portable computing device, and a third exercise performed in a floor-based position in front of the portable computing device, wherein the portable computing device captures full-body motion of the user without any angular adjustment of the portable computing device between the at least two exercises.

In Example 12, the subject matter of any of Examples 1-11 includes, wherein each of the first image sensor and the second image sensor has a focal length and sensor size selected to provide: a DFOV of greater than 110 degrees; an HFOV of greater than 90 degrees; and a VFOV of greater than 70 degrees.

In Example 13, the subject matter of Example 12 includes, wherein the DFOV is greater than 130 degrees.

In Example 14, the subject matter of any of Examples 12-13 includes, wherein the HFOV is greater than 100 degrees.

In Example 15, the subject matter of any of Examples 12-14 includes, wherein the VFOV is greater than 100 degrees.

In Example 16, the subject matter of any of Examples 1-15 includes, the operations further comprising: displaying, on a display screen of the portable computing device and while the user is performing the one or more exercises, a user interface comprising a digital video feed representing the images together with at least one of motion tracking output or instructions for performing the one or more exercises.

In Example 17, the subject matter of any of Examples 1-16 includes, wherein the first image sensor and the second image sensor are front-facing cameras that are spaced apart, along a longitudinal axis of the portable computing device, at a baseline of between 15 mm and 65 mm.

In Example 18, the subject matter of any of Examples 1-17 includes, wherein the portable computing device is a substantially rectangular tablet computing device, and the first image sensor and the second image sensor are front-facing cameras positioned at or adjacent a long edge of the portable computing device.

In Example 19, the subject matter of any of Examples 1-18 includes, wherein the images are captured while a support stand holds a front face of the portable computing device in the substantially vertical orientation.

Example 20 is a computer-implemented method comprising: accessing images of a full body of a user captured by a first image sensor and a second image sensor of a portable computing device, the images captured while the portable computing device is positioned in a substantially vertical orientation and while the user is performing one or more exercises; processing the images to: generate high dynamic range HDR image data, and determine depth information associated with the user; and generating, in real time and while the user is performing the one or more exercises, motion tracking data based on the HDR image data and the depth information.

Example 21 is at least one machine-readable medium including instructions that, when executed by processing circuitry, cause the processing circuitry to perform operations to implement any of Examples 1-20.

Example 22 is an apparatus comprising means to implement any of Examples 1-20.

Example 23 is a system to implement any of Examples 1-20.

Example 24 is a method to implement any of Examples 1-20.

What is claimed is:

1. One or more non-transitory machine-readable storage media including instructions that, when executed by one or more processors, cause the one or more processors to perform operations comprising:
    accessing images of a full body of a user captured by a first image sensor and a second image sensor of a portable computing device, the images captured while the portable computing device is positioned in a substantially vertical orientation and while the user is performing one or more exercises;
    processing the images of the first image sensor and the second image sensor to:
        generate high dynamic range (HDR) image data, and
        determine depth information associated with the user; and
    generating, in real time and while the user is performing the one or more exercises, motion tracking data based on the HDR image data and the depth information, wherein generating the motion tracking data comprises generating pose estimation data by analyzing body landmarks of the user while the user performs the one or more exercises, the pose estimation data obtained by processing first input comprising the HDR image data generated from the images of the first image sensor and the second image sensor and second input comprising the depth information determined from the images of the first image sensor and the second image sensor.

2. The one or more non-transitory machine-readable storage media of claim 1, wherein the first image sensor and the second image sensor simultaneously capture pairs of images at different exposure levels, and the HDR image data is generated for each pair of images by a process comprising:
aligning a first image from the first image sensor and a second image from the second image sensor to obtain aligned image data, and
generating a final image using the aligned image data.

3. The one or more non-transitory machine-readable storage media of claim 2, wherein generating the final image comprises performing at least one of exposure fusion or tone mapping.

4. The one or more non-transitory machine-readable storage media of claim 2, wherein at least one of aligning the first image with the second image or generating the final image comprises executing one or more machine learning models.

5. The one or more non-transitory machine-readable storage media of claim 1, wherein determining the depth information comprises generating a depth map to estimate a distance between one or more body parts of the user and the portable computing device.

6. The one or more non-transitory machine-readable storage media of claim 1, wherein determining the depth information comprises executing one or more machine learning models.

7. The one or more non-transitory machine-readable storage media of claim 1, wherein processing of the images comprises performing stereoscopic correction using a first image from the first image sensor and a second image from the second image sensor.

8. The one or more non-transitory machine-readable storage media of claim 1, wherein processing the first input comprising the HDR image data and the second input comprising the depth information comprises:
generating the pose estimation data based on the HDR image data; and
adjusting the pose estimation data through post-processing using the depth information.

9. The one or more non-transitory machine-readable storage media of claim 1, wherein the images comprise a plurality of images captured over time at a fixed, substantially vertical axis.

10. The one or more non-transitory machine-readable storage media of claim 1, wherein the one or more exercises comprise at least two of:
a first exercise performed in a substantially upright position in front of the portable computing device,
a second exercise performed in a supported position in front of the portable computing device, and
a third exercise performed in a floor-based position in front of the portable computing device,
wherein the portable computing device captures full-body motion of the user without any angular adjustment of the portable computing device between the at least two exercises.

11. The one or more non-transitory machine-readable storage media of claim 1, wherein each of the first image sensor and the second image sensor has a focal length and sensor size selected to provide:
a diagonal field of view (DFOV) of greater than 110 degrees;
a horizontal field of view (HFOV) of greater than 90 degrees; and
a vertical field of view (VFOV) of greater than 70 degrees.

12. The one or more non-transitory machine-readable storage media of claim 11, wherein the DFOV is greater than 130 degrees.

13. The one or more non-transitory machine-readable storage media of claim 11, wherein the HFOV is greater than 100 degrees.

14. The one or more non-transitory machine-readable storage media of claim 11, wherein the VFOV is greater than 100 degrees.

15. The one or more non-transitory machine-readable storage media of claim 1, the operations further comprising:
displaying, on a display screen of the portable computing device and while the user is performing the one or more exercises, a user interface comprising a digital video feed representing the images together with at least one of motion tracking output or instructions for performing the one or more exercises.

16. The one or more non-transitory machine-readable storage media of claim 1, wherein the first image sensor and the second image sensor are front-facing cameras that are spaced apart, along a longitudinal axis of the portable computing device, at a baseline of between 15 mm and 65 mm.

17. The one or more non-transitory machine-readable storage media of claim 1, wherein the portable computing device is a substantially rectangular tablet computing device, and the first image sensor and the second image sensor are front-facing cameras positioned at or adjacent a long edge of the portable computing device.

18. The one or more non-transitory machine-readable storage media of claim 1, wherein the images are captured while a support stand holds a front face of the portable computing device in the substantially vertical orientation.

19. A computer-implemented method comprising:
accessing images of a full body of a user captured by a first image sensor and a second image sensor of a portable computing device, the images captured while the portable computing device is positioned in a substantially vertical orientation and while the user is performing one or more exercises;
processing the images of the first image sensor and the second image sensor to:
generate high dynamic range (HDR) image data, and
determine depth information associated with the user; and
generating, in real time and while the user is performing the one or more exercises, motion tracking data based on the HDR image data and the depth information,
wherein generating the motion tracking data comprises generating pose estimation data by analyzing body landmarks of the user while the user performs the one or more exercises, the pose estimation data obtained by processing first input comprising the HDR image data generated from the images of the first image sensor and the second image sensor and second input comprising the depth information determined from the images of the first image sensor and the second image sensor.

20. The one or more non-transitory machine-readable storage media of claim 1, wherein the body landmarks comprise three-dimensional (3D) landmark positions, and generating the motion tracking data comprises:
 while the user performs the one or more exercises, executing a machine learning model that processes the HDR image data as the first input and the depth information as the second input to generate the 3D landmark positions.

* * * * *

UNITED STATES PATENT AND TRADEMARK OFFICE
CERTIFICATE OF CORRECTION

| | | |
|---|---|---|
| PATENT NO. | : 12,456,204 B1 | Page 1 of 1 |
| APPLICATION NO. | : 19/097799 | |
| DATED | : October 28, 2025 | |
| INVENTOR(S) | : de Oliveira et al. | |

It is certified that error appears in the above-identified patent and that said Letters Patent is hereby corrected as shown below:

In the Claims

In Column 43, Line 18, in Claim 2, delete "data," and insert --data;-- therefor

Signed and Sealed this
Third Day of February, 2026

John A. Squires
*Director of the United States Patent and Trademark Office*